United States Patent
Satoh et al.

(10) Patent No.: US 12,179,264 B2
(45) Date of Patent: Dec. 31, 2024

(54) OBJECT PRODUCING METHOD

(71) Applicants: Shinichiroh Satoh, Tokyo (JP); Naoki Oya, Kanagawa (JP)

(72) Inventors: Shinichiroh Satoh, Tokyo (JP); Naoki Oya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 17/654,587

(22) Filed: Mar. 12, 2022

(65) Prior Publication Data

US 2022/0305557 A1 Sep. 29, 2022

(30) Foreign Application Priority Data

Mar. 22, 2021 (JP) ................................ 2021-047716
Mar. 8, 2022 (JP) ................................ 2022-035176

(51) Int. Cl.
*B22F 10/14* (2021.01)
*B29C 64/165* (2017.01)
(Continued)

(52) U.S. Cl.
CPC ............ *B22F 10/14* (2021.01); *B29C 64/165* (2017.08); *B33Y 10/00* (2014.12);
(Continued)

(58) Field of Classification Search
CPC ........................ B22F 10/14; B22F 2301/052; B22F 2999/00; B22F 10/64; B29C 64/165;
(Continued)

(56) References Cited

U.S. PATENT DOCUMENTS 11,045,976 B2 6/2021 Sasaki et al.
2013/0244040 A1 9/2013 Oshima
(Continued)

FOREIGN PATENT DOCUMENTS

JP 5772668 7/2015
JP 2019-123208 7/2019
(Continued)

OTHER PUBLICATIONS

Extended European Search Report dated Sep. 5, 2022, in European Patent Application No. 22161799.6, 11 pages.
(Continued)

*Primary Examiner* — Brian D Walck
*Assistant Examiner* — Danielle Carda
(74) *Attorney, Agent, or Firm* — Grüneberg and Myers PLLC

(57) ABSTRACT

Provided is an object producing method including a powder layer forming step of forming a layer of a powder containing sinterable particles, an object forming liquid applying step of applying an object forming liquid to the layer of the powder to form an object forming region, and a sintering inhibiting liquid applying step of applying a sintering inhibiting liquid to the layer of the powder to form a sintering inhibited region in which sintering of the particles is inhibited, and includes a layer laminating step of sequentially repeating these steps to form a laminate. The object forming region and the sintering inhibited region adjoin each other. The sintering inhibiting liquid contains a first resin. The sintering inhibited region contains the first resin or a second resin derived from the first resin. A predicted amount of a residue calculated by a predetermined method is 800 ppm or greater.

19 Claims, 7 Drawing Sheets

(51) Int. Cl.
  *B29K 29/00*     (2006.01)
  *B29K 505/02*    (2006.01)
  *B33Y 10/00*     (2015.01)

(52) U.S. Cl.
  CPC ..... *B22F 2301/052* (2013.01); *B29K 2029/00* (2013.01); *B29K 2505/02* (2013.01)

(58) Field of Classification Search
  CPC ......... B33Y 10/00; B33Y 40/20; B33Y 70/10; B29K 2029/00; B29K 2505/02
  See application file for complete search history.

(56) References Cited

U.S. PATENT DOCUMENTS

| | | |
|---|---|---|
| 2015/0210016 A1 | 7/2015 | Okamoto |
| 2016/0040025 A1 | 2/2016 | Norikane et al. |
| 2016/0160021 A1 | 6/2016 | Kojima et al. |
| 2016/0177122 A1 | 6/2016 | Naruse et al. |
| 2016/0236412 A1 | 8/2016 | Kusahara et al. |
| 2016/0271695 A1 | 9/2016 | Osaka et al. |
| 2016/0271877 A1 | 9/2016 | Suzuki et al. |
| 2016/0271879 A1 | 9/2016 | Yamashita et al. |
| 2016/0272817 A1 | 9/2016 | Naruse et al. |
| 2016/0272844 A1 | 9/2016 | Osaka et al. |
| 2016/0288206 A1 | 10/2016 | Ohtaki et al. |
| 2018/0134029 A1 | 5/2018 | Myerberg et al. |
| 2019/0375014 A1 | 12/2019 | Kernan et al. |
| 2019/0388966 A1 | 12/2019 | Gibson et al. |
| 2020/0009795 A1 | 1/2020 | Gibson et al. |
| 2020/0290124 A1 | 9/2020 | Oya |
| 2021/0001543 A1 | 1/2021 | Sogame et al. |
| 2021/0039311 A1 | 2/2021 | Kusahara et al. |
| 2021/0292511 A1 | 9/2021 | Satoh |

FOREIGN PATENT DOCUMENTS

| | | | |
|---|---|---|---|
| WO | 2019/177643 | 9/2019 | |
| WO | WO-2019177643 A1 * | 9/2019 | ............ B22F 1/0011 |
| WO | WO2021/193339 A1 | 9/2021 | |

OTHER PUBLICATIONS

Khoshnevis et al., "Metallic part fabrication using selective inhibition sintering (SIS)", Rapid Prototyping Journal, vol. 18, No. 2, Mar. 2, 2012, pp. 144-153.

* cited by examiner

OBJECT PRODUCING METHOD

CROSS-REFERENCE TO RELATED APPLICATIONS

The present application claims priority under 35 U.S.C. § 119 to Japanese Patent Application No. 2021-047716 filed Mar. 22, 2021, and Japanese Patent Application No. 2022-035176 filed Mar. 8, 2022. The contents of which are incorporated herein by reference in their entirety.

BACKGROUND OF THE INVENTION

Field of the Invention

The present disclosure relates to an object producing method.

Description of the Related Art

In recent years, there have been increasing needs for producing complicated, minute objects formed of, for example, metals. As a technique for meeting these needs in terms of a high productivity in particular, there is a method of forming a sintering precursor by a binder jetting method, and sintering and densifying the sintering precursor by a powder metallurgy method.

However, through a sintering step, the sintered body obtained may have undergone deformation such as warping or straining. As a method for suppressing this deformation, a method of using a support material having a shape conforming to the sintering precursor for supporting the sintering precursor is being studied. However, if the sintering precursor is sintered in a state contacting the support material, the sintered body and the support material are bound with each other and it may be difficult to remove the support material.

United States Patent Application Publication No. 2019/0375014 discloses a technique for improving releasability between a sintered body and a support material by sintering a product in which a powder of a sintering inhibiting material such as ceramics interfaces between a sintering precursor and the support material.

SUMMARY OF THE INVENTION

According to an embodiment of the present disclosure, an object producing method includes a powder layer forming step of forming a layer of a powder containing sinterable particles, an object forming liquid applying step of applying an object forming liquid to the layer of the powder to form an object forming region, and a sintering inhibiting liquid applying step of applying a sintering inhibiting liquid to the layer of the powder to form a sintering inhibited region in which sintering of the particles is inhibited, and includes a layer laminating step of sequentially repeating the powder layer forming step, the object forming liquid applying step, and the sintering inhibiting liquid applying step to form a laminate. The object forming region and the sintering inhibited region adjoin each other. The sintering inhibiting liquid contains a first resin. The sintering inhibited region contains the first resin or a second resin derived from the first resin. A predicted amount of a residue calculated by multiplying a mass ratio (mass of the first resin or the second resin/mass of the powder) between a mass of the first resin or the second resin and a mass of the powder in a sintering inhibited part formed by laminating the sintering inhibited region by a ratio of a residue of the first resin or the second resin through thermal decomposition at 550 degrees C. is 800 ppm or greater.

DESCRIPTION OF THE EMBODIMENTS

Figure 1:
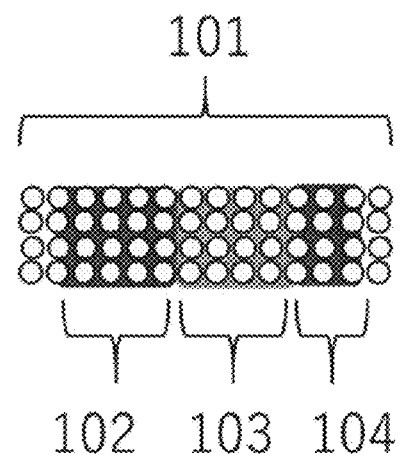
FIG. 1 is a schematic view illustrating an example of a powder layer including an object forming region, a sintering inhibited region, and a support region.

An embodiment of the present disclosure will be described below.

In forming a sintering inhibited region by applying a sintering inhibiting liquid for inhibiting sintering of particles to a layer of a powder containing sinterable particles, it has been difficult to provide an object producing method using a sintering inhibiting liquid that can sufficiently suppress the relative sintering density of a sintered product of the sintering inhibited region and has a high storage stability at the same time.

The present disclosure can provide an object producing method using a sintering inhibiting liquid that can sufficiently suppress the relative sintering density of a sintered product of a sintering inhibited region and has a high storage stability at the same time.

<<Object Producing Method>>

An object producing method includes a powder layer forming step of forming a layer of a powder containing sinterable particles, an object forming liquid applying step of applying an object forming liquid to the layer of the powder to form an object forming region, and a sintering inhibiting liquid applying step of applying a sintering inhibiting liquid to the layer of the powder to form a sintering inhibited region in which sintering of the particles is inhibited, and includes a layer laminating step of sequentially repeating the powder layer forming step, the object forming liquid applying step, and the sintering inhibiting liquid applying step to form a laminate.

Here, the object forming region and the sintering inhibited region adjoin each other.

The laminate includes an object forming part formed by laminating object forming regions, and a sintering inhibited part formed by laminating sintering inhibited regions.

In the present disclosure, the "object forming liquid" represents a liquid composition that is applied to a layer of a powder containing sinterable particles, to form an object forming region.

The "sintering inhibiting liquid" represents a liquid composition that is applied to a layer of a powder containing sinterable particles, to form a sintering inhibited region in which sintering of particles is inhibited.

In the present disclosure, the "object forming part" represents a precursor structure of an object.

The "sintering inhibited part" represents a part previously formed between an object forming part (sintering precursor) and a support material, in order that the sintering precursor and the support material that supports the sintering precursor during sintering can be easily separated from each other after sintering. The sintering inhibited part represents a part that does not undergo sintering in the sintering step, or that will have a sufficiently low relative sintering density compared with the sintering precursor and the support material. The "sintering inhibited part" represents not a precursor structure of an object but a structure to be released from an object after sintering, and has a characteristic that the relative sintering density of a sintered product formed by sintering the sintering inhibited part is lower than the relative sintering density of a sintered product formed by sintering an object.

The object forming liquid applying step may be a step of applying an object forming liquid to a layer of a power to form an object forming region and a support region. Here, the object forming region and a sintering inhibited region adjoin each other, and the object forming region and the support region adjoin each other via the sintering inhibited region.

In this case, a laminate includes an object forming part formed by laminating object forming regions, a sintering inhibited part formed by laminating sintering inhibited regions, and a support part formed by laminating support regions.

In the present disclosure, the "support part" represents not a precursor structure of an object but a structure that supports the object forming part via the sintering inhibited part and is released from an object after sintering.

When the object forming liquid applying step is a step for forming an object forming region and a support region as described above, the object forming liquid represents a liquid composition that is applied to a layer of a powder containing sinterable particles, to form an object forming region and a support region.

It is preferable that the object producing method include, in addition to the layer laminating step described above, for example, a heating step of heating a laminate at a temperature suited to, for example, a softening point of a resin contained in the laminate, an excessive powder removing step of removing an excessive powder, which is the powder to which a liquid such as the object forming liquid or the sintering inhibiting liquid has not been applied, a drying step of removing a liquid component remaining in, for example, an object forming part and a sintering inhibited part, a degreasing step of heating, for example, the object forming part and the sintering inhibited part to remove at least a part of, for example, a resin contained in each part, to obtain degreased products, a sintering step of heating the degreased products of, for example, the object forming part and the sintering inhibited part, to obtain sintered products, and a post-treatment step of applying a post-treatment to the sintered products of, for example, the object forming part and the sintering inhibited part (e.g., a treatment for releasing the sintered product of, for example, the sintering inhibited part from the sintered product of the object forming part). In the present disclosure, the object forming part that has undergone the heating step may be referred to as "green body (unsintered body)", the object forming part that has undergone the degreasing step may be referred to as "degreased body", and the object forming part that has undergone the sintering step may be referred to as "sintered body".

In the present disclosure, an "object" is a generic term of stereoscopic objects retained in fixed stereoscopic shapes, and represents, for example, a green body or a structure derived from a green body. Specifically, an "object" is a concept representing, for example, a green body, a degreased body, and a sintered body.

Each step will be described in detail below.

<Powder Layer Forming Step>

The object producing method includes a powder layer forming step of forming a layer of a powder containing sinterable particles. The layer of the powder is formed on a support (object forming stage).

The method for placing the powder on the support and forming a thin layer of the powder is not particularly limited and may be appropriately selected depending on the intended purpose. Examples of the method include a method using, for example, a known counter rotating mechanism (counter roller) employed in a selective laser sintering method described in Japanese Patent No. 3607300, a method for spreading a powder using such a member as a brush, a roller, and a blade, a method for pressing the surface of a powder with a pressing member to spread the powder, and a method using a known additive manufacturing apparatus.

Formation of a powder layer using a powder layer forming unit such as a counter rotating mechanism (counter roller), a brush, a blade, and a pressing member can be performed in the manner described below.

That is, the counter rotating mechanism (counter roller), the brush, the roller, or the blade, or the pressing member places a powder on a support that is disposed within an outer frame (may also be referred to as, for example, "mold", "hollow cylinder", or "tubular structure") in a manner that the support can move upward and downward while sliding against the inner wall of the outer frame. When a support that can move upward and downward within the outer frame is used as the support, the powder is placed on the support, which is disposed at a position slightly lower than the upper-end opening of the outer frame, i.e. at a position lower by an amount corresponding to the thickness of one powder layer. In the way described above, a thin layer of the powder can be placed on the support.

The thickness of a powder layer is not particularly limited, and may be appropriately selected depending on the intended purpose. The average thickness per layer is preferably 30 micrometers or greater but 500 micrometers or less and more preferably 60 micrometers or greater but 300 micrometers or less.

When the average thickness of a powder layer is 30 micrometers or greater, a green body formed by applying an object forming liquid to the powder has an improved strength and can be suppressed from, for example, a shape collapse that may occur in a subsequent step such as a sintering step. When the average thickness of a powder layer is 500 micrometers or less, an object derived from a green body formed by applying an object forming liquid to the powder has an improved dimensional accuracy.

The average thickness can be measured by a known method that is not particularly limited.

The powder supplied by the powder layer forming unit may be stored in a powder storage. The powder storage is a member such as a container storing a powder. Examples of the powder storage include a storing tank, a bag, a cartridge, and a tank.

Sinterable Particles

The "sinterable particles (hereinafter, may also be referred to as "particles")" of the present disclosure represent particles used for production of an object and containing a sinterable material such as a metal as a constituent material. The constituent materials of the particles are not particularly limited so long as the particles contain a sinterable material. The particles may contain a material other than a sinterable material, but it is preferable that the main material of the particles be a sinterable material. Particles of which main material is a sinterable material represent particles in which the mass of the sinterable material contained in the particles is 50.0% by mass or greater, preferably 60.0% by mass or greater, more preferably 70.0% by mass or greater, yet more preferably 80.0% by mass or greater, and particularly preferably 90.0% by mass or greater relative to the mass of the particles.

It is preferable that the sinterable material, which is a constituent material of the particles, be a metal. Examples of the metal include magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals. Among these metals, stainless (SUS) steel, iron (Fe), copper (Cu), silver (Ag), titanium (Ti), aluminum (Al), and alloys of these metals are suitably used. Examples of aluminum alloys include $AlSi_{10}Mg$, $AlSi_{12}$, $AlSi_7Mg_{0.6}$, $AlSi_3Mg$, $AlSi_9Cu_3$, Scalmalloy, and $ADC_{12}$. One of these metals may be used alone or two or more of these metals may be used in combination.

The particles can be produced by a known method.

Examples of the method for producing the particles include a grinding method of applying, for example, compression, impacts, or friction to a solid to break the solid into pieces, an atomizing method of spraying a molten metal and rapidly cooling the resultant to obtain a powder, a precipitation method of precipitating a component dissolved in a liquid, and a gas phase reaction method of vaporizing and crystallizing a material. Among these methods, the atomizing method that can obtain a spherical shape with small particle diameter variation is preferable. Examples of the atomizing method include a water atomizing method, a gas atomizing method, a centrifugal atomizing method, and a plasma atomizing method. Any of these atomizing methods can be suitably used.

A commercially available product may be used as the particles.

Examples of the commercially available particles of which constituent material is a metal include pure Al (available from Toyo Aluminium K.K., A1070-30BB), pure Ti (available from Osaka Titanium Technologies Co., Ltd.), SUS316L (available from Sanyo Special Steel Co., Ltd., product name: PSS316L), $AlSi_{10}Mg$ (available from Toyo Aluminium K.K., $Si_{10}MgBB$), $SiO_2$ (available from Tokuyama Corporation, product name: EXCELLICA SE-15K), AlO. (available from Taimei Chemicals Co., Ltd., product name: TAIMICRON TM-5D), and $ZrO_2$ (available from Tosoh Corporation, product name: TZ-B53).

The volume average particle diameter of the particles is not particularly limited, may be appropriately selected depending on the intended purpose, and is preferably, for example, 2 micrometers or greater but 100 micrometers or less and more preferably 8 micrometers or greater but 50 micrometers or less. When the volume average particle diameter of the particles is 2 micrometers or greater, aggregation of the particles is suppressed, making it possible to suppress degradation of the object production efficiency and degradation of handleability of the particles. When the average particle diameter of the particles is 100 micrometers or less, it is possible to suppress reduction of contact points between the particles and increase of voids, and to suppress degradation of the strength of an object.

The particle size distribution of the particles is not particularly limited and may be appropriately selected depending on the intended purpose. A sharper particle size distribution is more preferable.

The volume average particle diameter and the particle size distribution of the particles can be measured with a known particle diameter measuring instrument. Examples of the known particle diameter measuring instrument include a particle diameter distribution measuring instrument MICROTRAC MT3000II SERIES (available from MicrotracBel Corporation).

—Powder Containing Sinterable Particles—

The particles described above are used as a powder, which is an aggregate containing a plurality of particles. The sintering inhibiting liquid and the object forming liquid are applied to a layer of the powder.

In addition to the sinterable particles, the powder may contain other components as needed. Examples of the other components include a filler, a leveling agent, a sintering aid, and polymeric resin particles.

The filler is a material effective for being attached on the surfaces of the particles or being filled in the voids between the particles. When the filler is used, for example, the powder has an improved fluidity and can include more contact points and less voids between the particles. As a result, the strength and dimensional accuracy of an object can be improved.

The leveling agent is a material effective for controlling the wettability on the surface of a layer of the powder. When the leveling agent is used, for example, the object forming liquid has an improved permeability into a layer of the powder and can improve the strength of an object.

The sintering aid is a material effective for improving the sintering efficiency during sintering of an object. When the sintering aid is used, for example, the strength of an object can be improved, the sintering temperature can be lowered, and the sintering time can be shortened.

The polymeric resin particles are a material effective for being attached on the surfaces of the particles, and are also referred to as an organic external additive. The average particle diameter of the polymeric resin particles is not particularly limited, and is preferably 0.1 micrometers or greater but 10 micrometers or less and more preferably 0.1 micrometers or greater but 1 micrometer or less.

The angle of repose of the powder is preferably 60 degrees or less, more preferably 50 degrees or less, and yet more preferably 40 degrees or less. When the angle of repose of the powder is 60 degrees or less, the powder can be efficiently and stably placed on a desired position of a support. The angle of repose can be measured with, for example, a powder characteristic measuring instrument (POWDER TESTER PT-N TYPE, available from Hosokawa Micron Corporation).

<Object Forming Liquid Applying Step>

The object producing method include an object forming liquid applying step of applying an object forming liquid to a layer of a powder to form an object forming region.

It is preferable that that the object forming liquid applying step be a step of applying an object forming liquid to a layer of a powder to form an object forming region and a support region.

Figure 2:
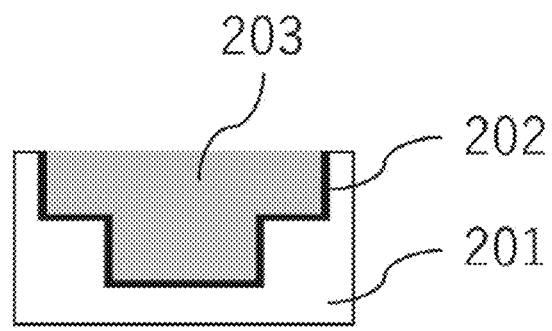
FIG. 2 is a schematic view illustrating an example of a structure including an object forming part, a sintering inhibited part, and a support part.

When forming a support region in the object forming liquid applying step, the object forming liquid for forming the support region is applied in a manner that a support region 102 to be formed in a powder layer 101 adjoins an object forming region 104 via a sintering inhibited region 103 as illustrated in FIG. 1. As a result, as illustrated in FIG. 2, a support part 201 formed by laminating support regions is placed in a manner to support an object forming part 203 via a sintering inhibited part 202 in the degreasing step and the sintering step (in other words, the support part 201 is provided in a manner to conform to the ups and downs of the object forming part 203 via the sintering inhibited part 202). This suppresses breakage or deformation of the object forming part. Particularly, an object forming part having a shape including a protruding part that is referred to as an overhang and is provided at upper levels, but including no structure for supporting the protruding part below the protruding part tends to break or deform by the own weight in the degreasing step or the sintering step. Therefore, by providing a support part below the overhang, it is possible to suppress breakage or deformation. When forming a support region in the object forming liquid applying step, the timings at which an object forming region and a support region are formed need not be continuous. For example, a sintering inhibited region may be formed after an object forming region is formed and before a support region is formed.

As the method for applying the object forming liquid to the layer of the powder, a method of discharging the object forming liquid is preferable. The method for discharging the object forming liquid is not particularly limited and may be appropriately selected depending on the intended purpose. Examples of the method include a dispenser method, a spray method, and an inkjet method. Among these methods, the dispenser method has excellent liquid droplet quantitativity, but has a small coating area coverage. The spray method can form a minute jet of materials easily and has a wide coating area coverage and excellent coatability, but has a poor liquid droplet quantitativity and has scattering of the object forming liquid due to a spray current. Hence, the inkjet method is preferable. The inkjet method is preferable because the inkjet method has a liquid droplet quantitativity better than the liquid droplet quantitativity of the spray method, has a coating area coverage greater than the coating area coverage of the dispenser method, and can form, for example, a complicated object forming region with a good accuracy efficiently.

When using the inkjet method, the object forming liquid applying unit configured to apply the object forming liquid by discharging the object forming liquid is an inkjet head including nozzles through which the object forming liquid is discharged.

As the inkjet head, an inkjet head of a known inkjet printer can be suitably used. Examples of the inkjet head of an inkjet printer include an industrial inkjet RICOH MH/GH SERIES available from Ricoh Company, Ltd. Examples of the inkjet printer include SG7100 available from Ricoh Company, Ltd.

In addition to the step of applying an object forming liquid to a layer of a powder, the object forming liquid applying step may further include applying the object forming liquid to a sintering inhibited region formed in the below-described sintering inhibiting liquid applying step after the sintering inhibited region is thus formed. This makes it possible to improve the strength of a sintering inhibited part before the degreasing step and improve handleability of a green body (unsintered body). Moreover, because the sintering inhibited region contains two kinds of resins (a second resin and an object forming resin described below), the resins are degreased in the degreasing step through two stages. This suppresses, for example, excessive cracking of the sintering inhibited part in the degreasing step.

The object forming liquid supplied to the object forming liquid applying unit may be stored in an object forming liquid storage. The object forming liquid storage is a member such as a container storing the object forming liquid. Examples of the object forming liquid storage include a storing tank, a bag, a cartridge, and a tank.

—Object Forming Liquid—

The object forming liquid contains a resin, an organic solvent, and additives such as a surfactant. Various components contained in the object forming liquid will be described in detail below.

In order to distinguish among the resin contained in the object forming liquid, the resin (first resin) contained in the sintering inhibiting liquid described below, the resin (second resin) derived from the resin contained in the sintering inhibiting liquid, and a resin (third resin) produced by contact between a resin producing liquid X and a resin producing liquid Y, the resin contained in the object forming liquid may be referred to as "object forming resin".

—Resin (Object Forming Resin)—

The resin contained in the object forming liquid is deployed in a layer of a powder when the object forming liquid is applied to the layer of the powder containing sinterable particles, and functions as a binder that binds the sinterable particles with each other in an object forming region through an appropriate heating step suited to the softening point of the resin.

The resin used in the object forming liquid is not particularly limited. Examples of the resin include a resin containing a structural unit represented by Structural formula (1) below. In the present disclosure, a "structural unit" represents a partial structure in a resin derived from one or more polymerizable compounds.

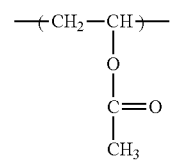

The resin containing the structural unit represented by Structural formula (1) can be appropriately removed in the degreasing step because of its excellent thermal decomposability, and a sintered body produced through the subsequent sintering step has an improved relative sintering density.

Specifically, it is preferable that the resin containing the structural unit represented by Structural formula (1) be thermally decomposed by 95% by mass or greater, more preferably 97% by mass or greater when subjected to temperature elevation from 30 degrees C. to 550 degrees C.

Thermal decomposability is measured with a thermogravimetry-differential thermal analysis system (TG-DTA).

Specifically, the ratio of weight reduction between before and after temperature elevation is obtained when the resin is subjected to temperature elevation from 30 degrees C. to 550 degrees C. at a rate of 10 degrees C./minute in the atmosphere or a nitrogen atmosphere, and then subjected to temperature retention for 2 hours after the temperature reaches 550 degrees C.

Specific examples of the resin containing the structural unit represented by Structural formula (1) include polyvinyl acetate resins, partially saponified polyvinyl acetate resins, and polyvinyl butyral resins. These resins may be used alone or two or more of these resins may be used in combination. Commercially available products and synthesized products may both be used.

A partially saponified polyvinyl acetate resin is a resin obtained by partially saponifying a polyvinyl acetate resin. A partially saponified polyvinyl acetate resin of the present disclosure has a degree of saponification of 40 or less, preferably 35 or less, more preferably 30 or less, yet more preferably 25 or less, and still more preferably 20 or less.

The content of the resin containing the structural unit represented by Structural formula (1) is preferably 5.0% by mass or greater, more preferably 7.0% by mass or greater, yet more preferably 10.0% by mass or greater, and particularly preferably 11.0% by mass or greater relative to the mass of the object forming liquid. The content of the resin containing the structural unit represented by Structural formula (1) is preferably 30.0% by mass or less, more preferably 25.0% by mass or less, and yet more preferably 20.0% by mass or less.

—Organic Solvent—

The object forming liquid contains an organic solvent. The organic solvent is a liquid component used for maintaining the object forming liquid in a liquid state at normal temperature.

Moreover, it is preferable that the object forming liquid be a nonaqueous object forming liquid by containing an organic solvent.

In the present disclosure, a "nonaqueous object forming liquid" represents an object forming liquid that contains an organic solvent as a liquid component of the object forming liquid and in which the component that has the maximum mass among liquid components is an organic solvent. The content of the organic solvent relative to the content of the liquid components of the object forming liquid is preferably 90.0% by mass or greater and more preferably 95.0% by mass or greater.

This is because when the object forming liquid is nonaqueous, the resin containing the structural unit represented by Structural formula (1) particularly has an improved solubility and suppresses the viscosity of the object forming liquid.

A nonaqueous object forming liquid can be paraphrased as an object forming liquid substantially free of water. Hence, even when the material constituting the sinterable particles is a highly active metal, i.e. a water-reactive material (e.g., aluminum, zinc, and magnesium), the object forming liquid can be applied to the material. As an example, there is a problem that handling of aluminum is difficult because aluminum emits hydrogen when aluminum contacts water. This problem can be avoided when an object forming liquid free of water is used.

Examples of the organic solvent include n-octane, m-xylene, Solvent naphtha, diisobutyl ketone, 3-heptanone, 2-octanone, acetyl acetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis 2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate, γ-butyrolactone, propylene carbonate, cyclohexanone, and butyl cellosolve. One of these organic solvents may be used alone or two or more of these organic solvents may be used in combination.

The content of the organic solvent is preferably 60.0% by mass or greater but 95.0% by mass or less and more preferably 70.0% by mass or greater but 95.0% by mass or less relative to the mass of the object forming liquid.

—Additives—

The object forming liquid may appropriately contain, for example, a surfactant, an anti-drying agent, a viscosity modifier, a penetrant, a defoaming agent, a pH regulator, an antiseptic, an antifungal agent, a colorant, a preservative, and a stabilizer depending on the intended purpose. Hitherto known materials may be used as these additives.

—Other Components-

The object forming liquid is substantially free of water. In the present disclosure, an object forming liquid "substantially free of water" represents an object forming liquid in which the water content is 10.0% by mass or less relative to the mass of the object forming liquid. The water content in the object forming liquid is preferably 5.0% by mass or less, more preferably 3.0% by mass or less, and yet more preferably 1.0% by mass or less, and it is particularly preferable that the object forming liquid be free of water. In the present disclosure, "an object forming liquid free of water" represents an object forming liquid produced without proactively using water as the material, or an object forming liquid in which the water content is less than or equal to the limit of detection when measured by a known method among common general technical knowledge.

Moreover, even when the material constituting the particles is a highly active metal, i.e. a water-reactive material (e.g., aluminum, zinc, and magnesium), the object forming liquid substantially free of water can be applied to the material. As an example, there is a problem that handling of aluminum is difficult because aluminum emits hydrogen when aluminum contacts water. This problem can be avoided when the object forming liquid is free of water.

—Producing Method—

The method for producing the object forming liquid is not particularly limited and may be appropriately selected depending on the intended purpose. Examples of the method include a method of mixing and stirring the materials described above.

—Properties—

It is preferable that the viscosity of the object forming liquid be low as described above. Specifically, the viscosity of the object forming liquid is preferably 5 mPa·s or higher but 50 mPa·s or lower, more preferably 5 mPa·s or higher but 40 mPa·s or lower, and yet more preferably 5 mPa·s or higher but 30 mPa·s or lower at 25 degrees C. When the viscosity of the object forming liquid is in the range described above, discharging of the object forming liquid from an object forming liquid applying unit such as an inkjet head is stabilized, and dimensional accuracy is improved.

The viscosity can be measured according to, for example, JIS K7117.

The surface tension of the object forming liquid is preferably 40 mN/m or less and more preferably 10 mN/m or greater but 30 mN/m or less at 25 degrees C. When the surface tension of the object forming liquid is 40 mN/m or less, discharging of the object forming liquid from an object forming liquid applying unit such as an inkjet head is stabilized, and dimensional accuracy is improved.

The surface tension can be measured with, for example, DY-300 available from Kyowa Interface Science Co., Ltd.

<Sintering Inhibiting Liquid Applying Step>

The object producing method includes a sintering inhibiting liquid applying step of applying a sintering inhibiting liquid to the layer of the powder to form a sintering inhibited region in which sintering of the particles is inhibited.

In the sintering inhibiting liquid applying step, the sintering inhibiting liquid is applied in a manner that a sintering inhibited region to be formed will adjoin an object forming region.

As the method for applying the sintering inhibiting liquid to the layer of the powder, a method of discharging the sintering inhibiting liquid is preferable. The method for discharging the sintering inhibiting liquid is not particularly limited and may be appropriately selected depending on the intended purpose. Examples of the method include a dispenser method, a spray method, and an inkjet method. Among these methods, the dispenser method has excellent liquid droplet quantitativity, but has a small coating area coverage. The spray method can form a minute jet of materials easily and has a wide coating area coverage and excellent coatability, but has a poor liquid droplet quantitativity and has scattering of the sintering inhibiting liquid due to a spray current. Hence, the inkjet method is preferable. The inkjet method is preferable because the inkjet method has a liquid droplet quantitativity better than the liquid droplet quantitativity of the spray method, has a coating area coverage greater than the coating area coverage of the dispenser method, and can form a complicated sintering inhibited region with a good accuracy efficiently.

When using the inkjet method, the sintering inhibiting liquid applying unit configured to apply the sintering inhibiting liquid by discharging the sintering inhibiting liquid is an inkjet head including nozzles through which the sintering inhibiting liquid is discharged. As the inkjet head, an inkjet head of a known inkjet printer can be suitably used. Examples of the inkjet head of an inkjet printer include an industrial inkjet RICOH MH/GH SERIES available from Ricoh Company, Ltd. Examples of the inkjet printer include SG7100 available from Ricoh Company, Ltd.

It is preferable that the amount of application of the sintering inhibiting liquid to be applied per unit area in order to form a sintering inhibited region in the sintering inhibiting liquid applying step be higher than the amount of application of the object forming liquid applied per unit area in order to form an object forming region in the object forming liquid applying step. This is preferable because this improves the strength, and consequently the handleability of a sintering inhibited part before the degreasing step, and the relative sintering density of the sintering inhibited part is better suppressed through the sintering step and the sintered product of the sintering inhibited part can be easily released from a sintered product of an object forming part.

Figure 3:
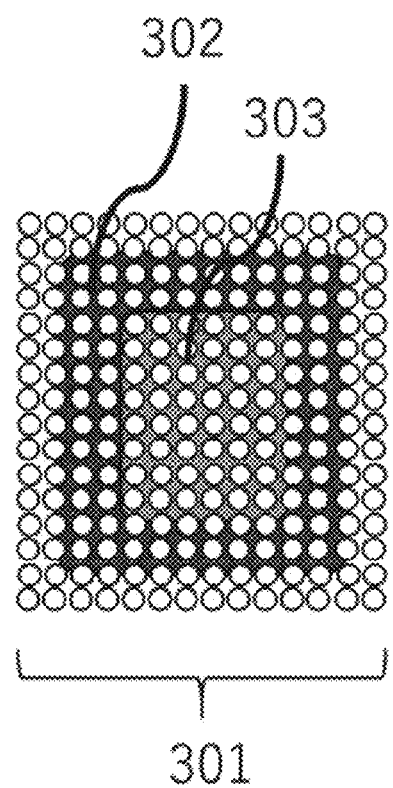
FIG. 3 is a schematic view illustrating an example of a powder layer including an object forming region and a sintering inhibited region surrounding the circumference of the object forming region.

It is preferable that the sintering inhibited region 302 formed in the sintering inhibiting liquid applying step be placed in a manner to surround the circumference of an object forming region 303 in a powder layer 301 as illustrated in FIG. 3. This suppresses the sintering inhibited part from collapsing in the sintering step, and improves the dimensional accuracy of an object.

It is preferable to apply the sintering inhibiting liquid in the sintering inhibiting liquid applying step within 100 msec from when the object forming liquid is applied in the object forming liquid applying step at the boundary between an object forming region and a sintering inhibited region. Specifically, for example, when the object forming liquid and the sintering inhibiting liquid are applied to a powder layer in the form of liquid droplets respectively, positions to which liquid droplets of the object forming liquid are applied and positions to which liquid droplets of the sintering inhibiting liquid are applied adjoin each other in the powder layer at the boundary between the object forming region and the sintering inhibited region. Regarding the timings to apply the liquid droplets to be applied to these positions, the above description means that the liquid droplets of the sintering inhibiting liquid are applied within 100 msec from when the liquid droplets of the object forming liquid are applied. This suppresses the object forming liquid applied to the powder from exuding to the positions intended to become the sintering inhibited region, and improves the dimensional accuracy of an object.

The sintering inhibiting liquid supplied to the sintering inhibiting liquid applying unit may be stored in a sintering inhibiting liquid storage. The sintering inhibiting liquid storage is a member such as a container storing the sintering inhibiting liquid. Examples of the sintering inhibiting liquid storage include a storing tank, a bag, a cartridge, and a tank.

—Sintering Inhibiting Liquid—

The sintering inhibiting liquid contains a first resin, an organic solvent, and additives such as a surfactant. Properties of the sintering inhibiting liquid and various components contained in the sintering inhibiting liquid will be described in detail below.

As described above, the sintering inhibiting liquid contains a first resin. Therefore, a sintering inhibited region formed by applying the sintering inhibiting liquid to a layer of a powder containing sinterable particles contains the first resin or a second resin derived from the first resin.

The second resin is not particularly limited so long as the second resin is a resin derived from the first resin. The second resin may be a resin chemically the same as the first resin or may be a resin chemically different from the first resin. Examples of the case when the second resin is chemically different from the first resin include a case when the first resin chemically changes due to, for example, a heating step performed after the sintering inhibiting liquid is applied to a powder layer (for example, the first resin undergoes a cross-linking reaction to produce the second resin).

A sintering inhibited region formed by applying the sintering inhibiting liquid to a layer of a powder containing sinterable particles may contain the first resin. Examples of this case include a case where the first resin does not chemically change in a heating step performed after the sintering inhibiting liquid is applied to the layer of the powder.

—Predicted Amount of Residue—

The sintering inhibiting liquid has a predetermined characteristic regarding the first resin or the second resin. Specifically, the sintering inhibiting liquid has a characteristic that a predicted amount of a residue calculated by multiplying the mass ratio of the first resin or the second resin to the powder in a sintering inhibited region by a ratio of a residue of the first resin or the second resin through thermal decomposition at 550 degrees C. is 800 ppm or greater, preferably 1,000 ppm or greater, and yet more preferably 1,200 ppm or greater. When the predicted amount of the residue is 800 ppm or greater, the relative sintering density of a sintered product of the sintering inhibited region can be sufficiently suppressed (the relative sintering density of a "sintering inhibited part" formed by laminating sintering inhibited regions can also be sufficiently suppressed), and releasability when releasing the sintered product of the sintering inhibited part from a sintered product of an object forming part is improved. Next, the method for calculating the predicted amount of the residue will be described in detail.

In the present disclosure, the "mass ratio of the first resin or the second resin to the powder in a sintering inhibited part formed by laminating the sintering inhibited region" is expressed by the following formula: "mass of the first resin or the second resin in the sintering inhibited part/mass of the powder in the sintering inhibited part".

This formula is calculated using a sintering inhibited part that is formed according to the object producing method (including, for example, the kind of the sinterable particles to which the sintering inhibiting liquid is applied, the amount of application of the sintering inhibiting liquid, and information on the method for using the sintering inhibiting liquid, such as the method for post-treatment after the sintering inhibiting liquid is applied).

When there is a specific device using the sintering inhibiting liquid, examples of the method for using the sintering inhibiting liquid include the procedure for using the sintering inhibiting liquid, stored in the specific device.

Examples of a specific procedure for using the sintering inhibiting liquid include a procedure of forming one powder layer (with an average thickness of 84 micrometers) formed of particles of an aluminum alloy (material: $AlSi_{10}Mg$, with a volume average particle diameter of 35 micrometers), applying the sintering inhibiting liquid to the powder layer in an amount of 45 pL per 300 dpi×300 dpi region, and subsequently leaving the resultant to stand in an environment at 200 degrees C. for 4 hours. For the sintering inhibited part produced according to this procedure, the formula described above is calculated.

The "mass of the first resin or the second resin in the sintering inhibited part" described above can be calculated by, for example, multiplying the ratio (w/v %) of the first resin contained in the sintering inhibiting liquid by the volume of the sintering inhibiting liquid applied to the sintering inhibited part per layer, and by the number of layers.

The "mass of the powder in the sintering inhibited part" described above can be calculated by, for example, multiplying the volume of the powder in the sintering inhibited part per layer by the density of the powder, and by the number of layers.

The "mass ratio of the first resin or the second resin to the powder in the sintering inhibited part" described above is preferably 3,000 ppm or greater, more preferably 4,000 ppm or greater, and yet more preferably 5,000 ppm or greater. When the mass ratio is 3,000 ppm or greater, it is easy for the predicted amount of the resin to be 800 ppm or greater.

The "mass ratio of the first resin or the second resin to the powder in the sintering inhibited part" is preferably 60,000 ppm or less and more preferably 16,000 ppm or less. When the mass ratio is 60,000 ppm or less, the amount of application of the sintering inhibiting liquid is not excessive, and productivity is improved.

In the present disclosure, the "ratio of a residue of the first resin or the second resin through thermal decomposition at 550 degrees C." is expressed by the following formula: "mass of a residue of the first resin or the second resin when the first resin or the second resin is thermally decomposed at 550 degrees C./mass of the first resin or the second resin before thermal decomposition".

Like the calculation of the "mass ratio of the first resin or the second resin to the powder in the sintering inhibited part" described above, this formula is calculated using a sintering inhibited part that is formed according to the object producing method.

That is, the resin that is derived from the first resin in a sintering inhibited part that is formed according to the object producing method is defined as the second resin in the formula.

The "mass of a residue of the first resin or the second resin when the first resin or the second resin is thermally decomposed at 550 degrees C." described above is measured using, for example, a thermogravimetry-differential thermal analysis system (TG-DTA). Specifically, when a sintering inhibited part that is formed according to the object producing method is subjected to temperature elevation from 30 degrees C. to 550 degrees C. at a rate of 10 degrees C./minute in the atmosphere or a nitrogen atmosphere and then subjected to temperature retention for 2 hours after the temperature reaches 550 degrees C., the weight after the temperature elevation (mass of the residue) is measured.

The "ratio of a residue of the first resin or the second resin through thermal decomposition at 550 degrees C." is preferably 0.100 or greater, more preferably 0.130 or greater, yet more preferably 0.150 or greater, and particularly preferably 0.200 or greater. When the ratio of a residue through thermal decomposition is 0.100 or greater, it is easy for the predicted amount of a residue to be 800 ppm or greater.

—Relative Sintering Density—

As described above, a sintering inhibited part formed by laminating sintering inhibited regions formed using the sintering inhibiting liquid has a characteristic that the relative sintering density of a sintered product formed by sintering the sintering inhibited part is low. When the relative sintering density is low, specifically, it is preferable that the relative sintering density be 85% or lower, more preferably 80% or lower, yet more preferably 75% or lower, still more preferably 70% or lower, still yet more preferably 65% or lower, still yet even more preferably 60% or lower, and particularly preferably 55% or lower. In this case, a releasability improving effect can be obtained when the sintered product of the sintering inhibited part is released from a sintered product of an object forming part.

The relative sintering density represents the ratio of the density of a sintered product to the true density of the material constituting the sintered product. These densities can be measured by a known method.

—First Resin—

The sintering inhibiting liquid contains a first resin as a material for suppressing the relative sintering density of a sintered product formed by sintering a sintering inhibited part. Hitherto, ceramics have been used as the material for suppressing the relative sintering density described above. Such existing materials have a poor dispersibility in the sintering inhibiting liquid, making it difficult to discharge the sintering inhibiting liquid by an inkjet discharging method. Moreover, such existing materials have a poor settleability or re-dispersibility in the sintering inhibiting liquid, making it difficult to provide a sintering inhibiting liquid having a high storage stability. On the other hand, the present disclosure employs a resin instead of ceramics as the material for suppressing the relative sintering density described above, making it possible to improve dispersibility and storage stability of the sintering inhibiting liquid.

It is preferable that the first resin be a resin, the second resin derived from which can have a high ratio of a residue through thermal decomposition at 550 degrees C. Specific examples of the first resin include polyvinyl chloride, polyvinylidene chloride, cellulose acetate, polyacrylonitrile, acrylonitrile-styrene copolymers, acrylonitrile-butadiene-styrene copolymers, vinyl chloride-vinyl acetate copolymers, polyethylene terephthalate, phenol resins, melamine resins, urea resins, unsaturated polyester, epoxy resins, silicon resins, polyvinyl polypyrrolidone, and benzoguanamine resins. One of these resins may be used alone or two or more of these resins may be used in combination.

When using a first resin and a second resin that are chemically different from each other due to a chemical change of the first resin due to, for example, the heating step performed after the sintering inhibiting liquid is applied to a powder layer, it is preferable to use resins having a relationship that the ratio of a residue of the second resin through thermal decomposition at 550 degrees C. is higher than the ratio of a residue of the first resin through thermal decomposition at 550 degrees C. For example, polyvinyl pyrrolidone can be used as such a first resin. This is because polyvinyl pyrrolidone undergoes a cross-linking reaction in response to application of heat of 170 degrees C. or higher, to produce polyvinyl polypyrrolidone, which is the second resin.

When the sintering inhibited region contains the second resin, the ratio of a residue of the first resin through thermal decomposition at 550 degrees C. is measured in the manner described below, using the first resin alone.

<Method for Measuring the Ratio of a Residue of the First Resin Alone Through Thermal Decomposition>

When the first resin alone is subjected to temperature elevation from 30 degrees C. to 550 degrees C. at a rate of 10 degrees C./minute in the atmosphere or a nitrogen atmosphere and then subjected to temperature retention for 2 hours after the temperature reaches 550 degrees C., using a thermogravimetry-differential thermal analysis system (TG-DTA), the weight after the temperature elevation (mass of a residue) is measured.

It is preferable that the first resin be dissolved in the sintering inhibiting liquid in terms of improving dispersibility and storage stability of the sintering inhibiting liquid. However, the first resin may be dispersed in the sintering inhibiting liquid. When the first resin is dispersed in the sintering inhibiting liquid, the volume average particle diameter of the first resin is preferably 1 micrometer or less, more preferably 500 nm or less, and yet more preferably 300 nm or less in terms of improving dispersibility and storage stability of the sintering inhibiting liquid.

The content of the first resin is preferably 5.0% by mass or greater but 25.0% by mass or less and more preferably 10.0% by mass or greater but 20.0% by mass or less relative to the mass of the sintering inhibiting liquid. When the content of the first resin is 5.0% by mass or greater but 25.0% by mass or less, it is possible to satisfy both of suppression of the relative sintering density of a sintered product formed by sintering a sintering inhibited part and improvement of dispersibility and storage stability of the sintering inhibiting liquid.

—Organic Solvent—

The organic solvent is a liquid component used for maintaining the sintering inhibiting liquid in a liquid state at normal temperature. When dissolving the first resin in the sintering inhibiting liquid, an organic solvent in which the first resin dissolves is selected. When dispersing the first resin in the sintering inhibiting liquid, an organic solvent in which the first resin does not dissolve is selected.

It is preferable that the sintering inhibiting liquid be a nonaqueous sintering inhibiting liquid by containing an organic solvent. In the present disclosure, a "nonaqueous sintering inhibiting liquid" represents a sintering inhibiting liquid that contains an organic solvent as a liquid component of the sintering inhibiting liquid and in which the component that has the maximum mass among liquid components is an organic solvent. The content of the organic solvent relative to the content of the liquid components of the sintering inhibiting liquid is preferably 90.0% by mass or greater and more preferably 95.0% by mass or greater. A nonaqueous sintering inhibiting liquid can be paraphrased as a sintering inhibiting liquid substantially free of water. Hence, even when the material constituting the sinterable particles is a highly active metal, i.e. a water-reactive material (e.g., aluminum, zinc, and magnesium), the sintering inhibiting liquid can be applied to the material. As an example, there is a problem that handling of aluminum is difficult because aluminum emits hydrogen when aluminum contacts water. This problem can be avoided when a sintering inhibiting liquid free of water is used.

The organic solvent is not particularly limited and may be appropriately selected depending on the kind of the first resin used in combination. Examples of the organic solvent include n-octane, m-xylene, Solvent naphtha, diisobutyl ketone, 3-heptanone, 2-octanone, acetyl acetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis 2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate. γ-butyrolactone, propylene carbonate, cyclohexanone, and butyl cellosolve. One of these organic solvents may be used alone or two or more of these organic solvents may be used in combination.

The content of the organic solvent is preferably 50.0% by mass or greater but 95.0% by mass or less and more preferably 70.0% by mass or greater but 90.0% by mass or less relative to the mass of the sintering inhibiting liquid. When the content of the organic solvent is 50.0% by mass or greater but 95.0% by mass or less, dispersibility and storage stability of the sintering inhibiting liquid can be improved.

—Additives—

The sintering inhibiting liquid may appropriately contain, for example, a surfactant, an anti-drying agent, a viscosity modifier, a penetrant, a defoaming agent, a pH regulator, an antiseptic, an antifungal agent, a colorant, a preservative, and a stabilizer depending on the intended purpose. Hitherto known materials may be used as these additives.

—Other Components—

The sintering inhibiting liquid is substantially free of water. In the present disclosure, a sintering inhibiting liquid "substantially free of water" represents a sintering inhibiting liquid in which the water content is 10.0% by mass or less relative to the mass of the sintering inhibiting liquid. The water content in the sintering inhibiting liquid is preferably 5.0% by mass or less, more preferably 3.0% by mass or less, and yet more preferably 1.0% by mass or less, and it is particularly preferable that the sintering inhibiting liquid be free of water. In the present disclosure, "a sintering inhibiting liquid free of water" represents a sintering inhibiting liquid produced without proactively using water as the material, or a sintering inhibiting liquid in which the water content is less than or equal to the limit of detection when measured by a known method among common general technical knowledge.

Moreover, even when the material constituting the sinterable particles is a highly active metal, i.e. a water-reactive material (e.g., aluminum, zinc, and magnesium), the sintering inhibiting liquid substantially free of water can be applied to the material. As an example, there is a problem that handling of aluminum is difficult because aluminum emits hydrogen when aluminum contacts water. This problem can be avoided when the sintering inhibiting liquid is free of water.

The sintering inhibiting liquid is free of ceramics. In the present disclosure, a sintering inhibiting liquid "free of ceramics" represents a sintering inhibiting liquid produced without proactively using ceramics as the material, or a sintering inhibiting liquid in which the content of ceramics is less than or equal to the limit of detection when measured by a known method among common general technical knowledge.

When the sintering inhibiting liquid is free of ceramics, dispersibility and storage stability of the sintering inhibiting liquid can be improved.

—Producing Method—

The method for producing the sintering inhibiting liquid is not particularly limited and may be appropriately selected depending on the intended purpose. Examples of the method include a method of mixing and stirring the materials described above.

—Properties—

It is preferable that the viscosity of the sintering inhibiting liquid be low as described above. Specifically, the viscosity of the sintering inhibiting liquid is preferably 5 mPa·s or higher but 50 mPa·s or lower, more preferably 5 mPa·s or higher but 40 mPa·s or lower, and yet more preferably 5 mPa·s or higher but 30 mPa·s or lower at 25 degrees C. When the viscosity of the sintering inhibiting liquid is in the range described above, discharging of the sintering inhibiting liquid from a sintering inhibiting liquid applying unit such as an inkjet head is stabilized.

The viscosity can be measured according to, for example, JIS K7117.

The surface tension of the sintering inhibiting liquid is preferably mN/m or less and more preferably 10 mN/m or greater but 30 mN/m or less at 25 degrees C. When the surface tension of the sintering inhibiting liquid is 40 mN/m or less, discharging of the sintering inhibiting liquid from a sintering inhibiting liquid applying unit such as an inkjet head is stabilized.

The surface tension can be measured with, for example, DY-300 available from Kyowa Interface Science Co., Ltd.

—Applications—

As described above, the sintering inhibiting liquid forms a sintering inhibited region when applied to a powder layer. Sintering inhibited regions form a sintering inhibited part through lamination of the sintering inhibited regions. The relative sintering density of a sintered product formed by sintering the sintering inhibited part is lower than the relative sintering density of a sintered product formed by sintering an object. Hence, a releasability improving effect can be obtained when releasing the sintered product of the sintering inhibited part from the sintered product of the object forming part. Applications of the sintering inhibiting liquid based on this effect are not particularly limited. Examples of the applications of the sintering inhibiting liquid include applications for improving releasability of a support part from an object forming part, applications as coupling parts that couple a plurality of object forming parts to each other, and applications in which the excessive powder removing step is omitted.

A case where the sintering inhibiting liquid is used in an application for improving releasability of a support part from an object forming part will be described. Specifically, for example, when providing a support part that supports an object forming part via a sintering inhibited part, an interface formed of a sintering inhibited part having a low relative sintering density is formed between a sintered product (sintered body) of the object forming part and a sintered product of the support part, to suppress binding between the sintered product of the object forming part and the sintered product of the support part. This makes it possible to improve releasability when releasing the sintered product of the support part from the sintered product of the object forming part.

A case where the sintering inhibiting liquid is used in an application as a coupling part that couples a plurality of object forming parts to each other will be described. A coupling part is a member for coupling a plurality of object forming parts to each other to form an integrated product in which a plurality of objects are integrated. Examples of the coupling part include a rod-like member of which end couples to an object forming part. When a plurality of object forming parts are in the form of the integrated product described above, it is possible to reduce the number of steps of placing the plurality of object forming parts in, for example, a sintering furnace by rearranging the plurality of object forming parts in, for example, the sintering step, and improve the working efficiency during production of an object. Moreover, by forming a coupling part in a manner that at least a region of the coupling part contacting an object forming part is a sintering inhibited part, it is possible to obtain a releasability improving effect when releasing a sintered product of the coupling part from a sintered product of the object forming part.

Figure 4:
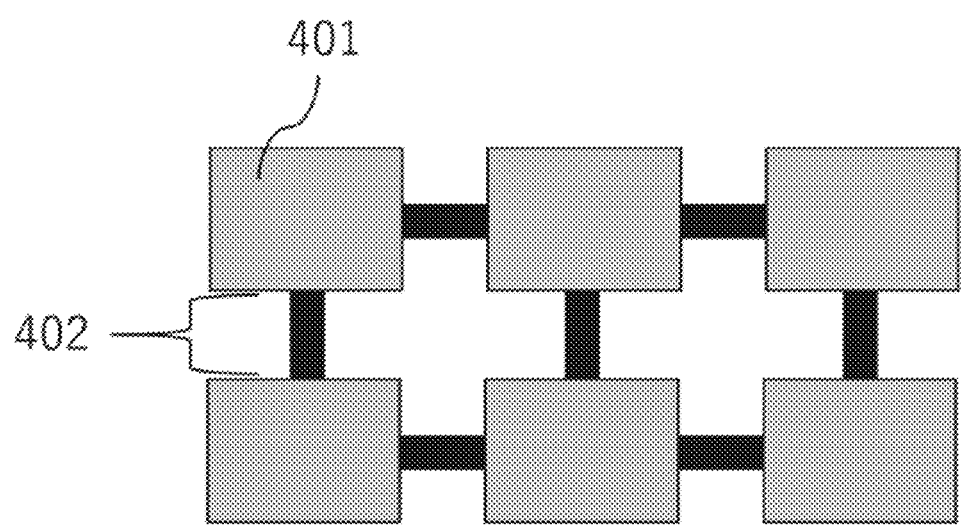
FIG. 4 is a schematic view illustrating an example of an integrated product in which a plurality of object forming parts and a plurality of coupling parts are integrated.

FIG. 4 is a schematic view illustrating an example of an integrated product in which a plurality of object forming parts and a plurality of coupling parts are integrated. The integrated product illustrated in FIG. 4 includes object forming parts 401 and coupling parts 402. The coupling parts 402 are formed of sintering inhibited parts.

A case where the sintering inhibiting liquid is used in an application in which the excessive powder removing step is omitted will be described. Typically, the excessive powder removing step of removing an excessive powder, which is a powder to which no liquid such as the object forming liquid or the sintering inhibiting liquid has been applied, is performed during production of an object. However, when the whole circumference of an object forming part is covered by a sintering inhibited part, no excessive powder can adhere to the object forming part, making it possible to omit the excessive powder removing step. However, omission of the excessive powder removing step means omission of use of an excessive powder removing unit or material such as a device capable of performing air blowing or a removing liquid, and removal of a level such as manually wiping off any excessive powder is not included in the targets of omission. Moreover, it is preferable that a sintering inhibited part covering the whole circumference of an object forming part be continuous to the external surface of a laminate and the external surface of the laminate be divided into two or more regions at a boundary, which is the sintering inhibited part exposed to the external surface, because it is easy to release sintered products of the sintering inhibited part and any excessive powder from a sintered product of the object forming part after the sintering step.

Figure 5:
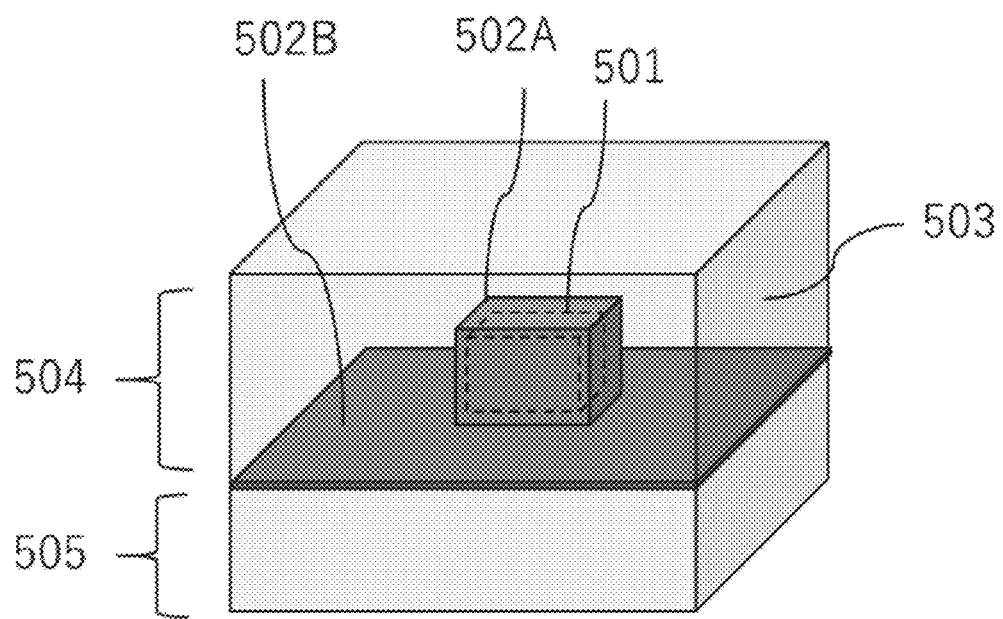
FIG. 5 is a schematic view illustrating an example of a laminate including an object forming part and a sintering inhibited part covering the whole circumference of the object forming part.

FIG. 5 is a schematic view illustrating an example of a laminate including an object forming part and a sintering inhibited part covering the whole circumference of the object forming part. The laminate illustrated in FIG. 5 includes an object forming part 501, a sintering inhibited part 502A internally including the object forming part 501 and covering the whole circumference of the object forming part 501, a plate-like sintering inhibited part 502B continuous to the sintering inhibited part 502A and to the external surface of the laminate, and excessive powder 503. The external surface of the laminate is divided into two regions 504 and 505 at the sintering inhibited part 502B serving as a boundary.

<Sintering Inhibiting Liquid Set Applying Step>

The object producing method may include a "sintering inhibiting liquid set applying step" instead of the "sintering inhibiting liquid applying step" described above. The sintering inhibiting liquid set applying step is a step of applying a resin producing liquid X and a resin producing liquid Y independently to a powder layer, to form a sintering inhibited region in which sintering of particles is inhibited by contact between the resin producing liquid X and the resin producing liquid Y in the powder layer to which the liquids have been applied. In other words, the sintering inhibiting liquid set applying step includes a resin producing liquid X applying step of applying the resin producing liquid X to a powder layer, a resin producing liquid Y applying step of applying the resin producing liquid Y to the powder layer, and a contacting step of forming a sintering inhibited region in which sintering of particles is inhibited by contact between the applied resin producing liquid X and the resin producing liquid Y in the powder layer. That is, being used instead of the sintering inhibiting liquid described above, the sintering inhibiting liquid set including the resin producing liquid X and the resin producing liquid Y plays the same function as the sintering inhibiting liquid and can be used in the same applications as the sintering inhibiting liquid.

As the method for applying the resin producing liquid X and the resin producing liquid Y to a powder layer, the same method as the method described in "Sintering inhibiting liquid applying step" described above can be used.

The resin producing liquid X applying step is suitably performed by a resin producing liquid X applying unit.

The resin producing liquid Y applying step is suitably performed by a resin producing liquid Y applying unit.

As the resin producing liquid X applying unit and the resin producing liquid Y applying unit, the same unit as the sintering inhibiting liquid applying unit described above can be used.

The resin producing liquid X supplied to the resin producing liquid X applying unit may be stored in a resin producing liquid X storage. The resin producing liquid X storage is a member such as a container storing the resin producing liquid X. Examples of the resin producing liquid X storage include a storing tank, a bag, a cartridge, and a tank.

The resin producing liquid Y supplied to the resin producing liquid Y applying unit may be stored in a resin producing liquid Y storage. The resin producing liquid Y storage is a member such as a container storing the resin producing liquid Y. Examples of the resin producing liquid Y storage include a storing tank, a bag, a cartridge, and a tank.

—Sintering Inhibiting Liquid Set—

The resin producing liquid X contains a resin precursor X, an organic solvent, and additives such as a surfactant. The resin producing liquid Y contains a resin precursor Y, an organic solvent, and additives such as a surfactant. The properties of the sintering inhibiting liquid set and the various components contained in the resin producing liquid X and the resin producing liquid Y will be described in detail below. However, the organic solvent and the additives such as the surfactant contained in the resin producing liquid X and the resin producing liquid Y will not be described because the same ones as the organic solvent and the additives such as the surfactant contained in the sintering inhibiting liquid can be used.

A sintering inhibited region contains a third resin produced by contact between the resin producing liquid X and the resin producing liquid Y. More specifically, the third resin is produced by contact between the resin producing liquid X and the resin producing liquid Y and a consequent reaction between the resin precursor X contained in the resin producing liquid X and the resin precursor Y contained in the resin producing liquid Y.

—Predicted Amount of Residue—

The sintering inhibiting liquid set has a predetermined characteristic regarding the third resin.

Specifically, the sintering inhibiting liquid set has a characteristic that a predicted amount of a residue calculated by multiplying the mass ratio of the third resin to the powder in a sintering inhibited region by a ratio of a residue of the third resin through thermal decomposition at 550 degrees C. is 800 ppm or greater. The predicted amount of the residue is preferably 1,000 ppm or greater and more preferably 1,200 ppm or greater. When the predicted amount of the residue is 800 ppm or greater, the relative sintering density of a sintered product of the sintering inhibited region can be sufficiently suppressed (and the relative sintering density of a "sintering inhibited part" formed by laminating sintering inhibited regions can also be sufficiently suppressed), and releasability when releasing the sintered product of the sintering inhibited part from a sintered product of an object forming part is improved. Next, the method for calculating the predicted amount of the residue will be described in detail.

In the present disclosure, the "mass ratio of the third resin to the powder in a sintering inhibited part formed by laminating the sintering inhibited region" is expressed by the following formula: "mass of the third resin in the sintering inhibited part/mass of the powder in the sintering inhibited part".

This formula is calculated using a sintering inhibited part that is formed according to the object producing method (including, for example, the kind of the sinterable particles to which the resin producing liquid X and the resin producing liquid Y are applied, the amount of application of the resin producing liquid X and the resin producing liquid Y, and information on the method for using the sintering inhibiting liquid set, such as the method for post-treatment after the resin producing liquid X and the resin producing liquid Y are applied).

When there is a specific device using the sintering inhibiting liquid set, examples of the method for using the sintering inhibiting liquid set include the procedure for using the sintering inhibiting liquid set, stored in the specific device.

Examples of a specific procedure for using the sintering inhibiting liquid set include a procedure of forming one powder layer (with an average thickness of 84 micrometers) formed of particles of an aluminum alloy (material: $AlSi_{10}Mg$, with a volume average particle diameter of 35 micrometers), applying the resin producing liquid X and the resin producing liquid Y to the powder layer each in an amount of 22.5 pL per 300 dpi×300 dpi region, and subsequently leaving the resultant to stand in an environment at 200 degrees C. for 4 hours. For the sintering inhibited region produced according to this procedure, the formula described above is calculated.

In the present disclosure, the "ratio of a residue of the third resin through thermal decomposition at 550 degrees C." is expressed by the following formula: "mass of a residue of the third resin when the third resin is thermally decomposed at 550 degrees C./mass of the third resin before thermal decomposition".

Like the calculation of the "mass ratio of the third resin to the powder in the sintering inhibited part" described above, this formula is calculated using a sintering inhibited part that is formed according to the object producing method. That is, the resin that is derived from the resin precursor X and the resin precursor Y and that is contained in a sintering inhibited part that is formed according to the object producing method is defined as the third resin in the formula.

—Relative Sintering Density—

As described above, a sintering inhibited part formed by laminating sintering inhibited regions formed using the sintering inhibiting liquid set has a characteristic that the relative sintering density of a sintered product formed by sintering the sintering inhibited part is low. When the relative sintering density is low, specifically, it is preferable that the relative sintering density be 85% or lower, more preferably 80% or lower, yet more preferably 75% or lower, still more preferably 70% or lower, still yet more preferably 65% or lower, still yet even more preferably 60% or lower, and particularly preferably 55% or lower. In this case, a releasability improving effect can be obtained when releasing the sintered product of the sintering inhibited part from a sintered product of an object forming part.

—Resin Precursor X and Resin Precursor Y—

The resin precursor X and the resin precursor Y are components that do not tend to settle in the resin producing liquid X and the resin producing liquid Y, respectively. Therefore, the resin producing liquid X and the resin producing liquid Y are excellent in dispersibility and storage stability.

The resin precursor X and the resin precursor Y that can be used are not particularly limited so long as the third resin can be produced through a reaction between the resin precursor X and the resin precursor Y. The reaction between the resin precursor X and the resin precursor Y is not limited to reactions that proceed merely by contact between the resin producing liquid X and the resin producing liquid Y, but may be reactions that proceed by contact between the resin producing liquid X and the resin producing liquid Y and a predetermined additional treatment (e.g., heating).

Specifically, one of the resin precursor X and the resin precursor Y may be selected from, for example, diglycidyl ethers and polyisocyanates, and the other may be selected from, for example, diamines.

Examples of the third resin produced from the resin precursor X and the resin precursor Y include epoxy resins and urea resins.

The content of the resin precursor X is preferably 20.0% by mass or greater relative to the mass of the resin producing liquid X. The content of the resin precursor Y is preferably 20.0% by mass or greater relative to the mass of the resin producing liquid Y. When the contents of the resin precursor X and the resin precursor Y are 20.0% by mass or greater, the relative sintering density of a sintered product formed by sintering a sintering inhibited part can be better suppressed.

<Layer Laminating Step>

The object producing method includes a layer laminating step of sequentially repeating the powder layer forming step, the object forming liquid applying step, and the sintering inhibiting liquid applying step to form a laminate. The object forming liquid applying step and the sintering inhibiting liquid applying step are performed after the powder layer forming step. However, the order of the object forming liquid applying step and the sintering inhibiting liquid applying step is not particularly limited. A "laminate" is a structure in which a plurality of powder layers each including an object forming region and a sintering inhibited region are laminated, and may be a structure in which a plurality of powder layers each including an object forming region, a sintering inhibited region, and a support region are laminated.

<Heating Step>

It is preferable that the object producing method include a heating step of heating the laminate at a temperature suited to, for example, the softening point of the resin contained in the laminate. The sinterable particles bind with each other via the resin that has softened, and form an object forming part (green body or unsintered body) that is retained in a fixed stereoscopic shape.

When the first resin contained in the sintering inhibiting liquid changes to a chemically different second resin through heating performed after the sintering inhibiting liquid is applied to a powder layer, the heating step may be performed at a temperature that promotes this change.

The heating unit is not particularly limited. Examples of the heating unit include a drying device, and a thermo-humidistat.

<Excessive Powder Removing Step>

It is preferable that the object producing method include an excessive powder removing step of removing an excessive powder, which is a powder to which, for example, the object forming liquid or the sintering inhibiting liquid has not been applied. It is preferable that the excessive powder removing step include either or both of a step of removing an excessive powder by air blowing, and a step of removing an excessive powder by immersion in a removing liquid. It is more preferable that the excessive powder removing step include both of the steps.

When removing an excessive powder by air blowing, it is preferable that, for example, an object forming part have a strength with which, for example, the object forming part can endure the air blowing pressure. The strength of, for example, an object forming part, expressed by a three-point bending stress, is preferably 3 MPa or higher and more preferably 5 MPa or higher.

When removing an excessive powder by immersion in a removing liquid, the removing liquid to be used contains, for example, an organic solvent and further contains other components as needed.

Examples of the organic solvent include ketones, halogens, alcohols, esters, ethers, hydrocarbons, glycols, glycol ethers, glycol esters, pyrrolidones, amides, amines, and carbonates.

<Drying Step>

It is preferable that the object producing method include a drying step of removing a liquid component remaining in, for example, an object forming part and a sintering inhibited part. As the drying unit, for example, a known drying device, and a known thermo-humidistat may be used.

<Degreasing Step>

It is preferable that the object producing method include a degreasing step of heating, for example, the object forming part and the sintering inhibited part to remove at least a part of, for example, a resin contained in each part, to obtain degreased products.

In the degreasing step, using a degreasing unit, heating is performed for a predetermined time (e.g., for from one hour through ten hours) at a temperature that is higher than or equal to the thermal decomposition temperature of an organic substance such as a resin and lower than the melting point or the solidus line temperature of the material constituting the sinterable particles (e.g., about 570 degrees C. when $AlSi_{10}Mg$ particles are used), to decompose and remove the organic substance. Examples of the degreasing unit include a known sintering furnace and a known electric furnace.

<Sintering Step>

It is preferable that the object producing method include a sintering step of heating the degreased products of, for example, the object forming part and the sintering inhibited part to obtain sintered products.

In the sintering step, using a sintering unit, the degreased products are heated for a predetermined time (e.g., for from one hour through ten hours) at a heating temperature that is higher than or equal to the solidus line temperature of the material constituting the sinterable particles and lower than or equal to the liquidus line temperature of the material, to integrate the material constituting the sinterable particles. The heating temperature is preferably 550 degrees C. or higher but 600 degrees C. or lower when, for example, particles containing aluminum are used as the sinterable particles. The heating temperature is preferably 570 degrees C. or higher but 600 degrees C. or lower when, more specifically, $AlSi_{10}Mg$ particles are used as the sinterable particles. Examples of the sintering unit include a known sintering furnace. The sintering unit may be the same unit as the degreasing unit described above. The degreasing step and the sintering step may be performed continuously.

<Post-Treatment Step>

It is preferable that the object producing method include a post-treatment step of applying a post-treatment to the sintered products of, for example, the object forming part and the sintering inhibited part. The post-treatment step is not particularly limited and may be appropriately selected depending on the intended purpose. Examples of the post-treatment step include a step of releasing the sintered product of, for example, the sintering inhibited part from the sintered product of the object forming part, a surface protection treatment step, and a painting step.

<Object Production Flow>

The object production flow of the object producing method of the present disclosure will be described with reference to FIG. 6A to FIG. 6E. FIG. 6A to FIG. 6E are schematic views illustrating an example of the operation of an object producing apparatus.

Figure 6A:
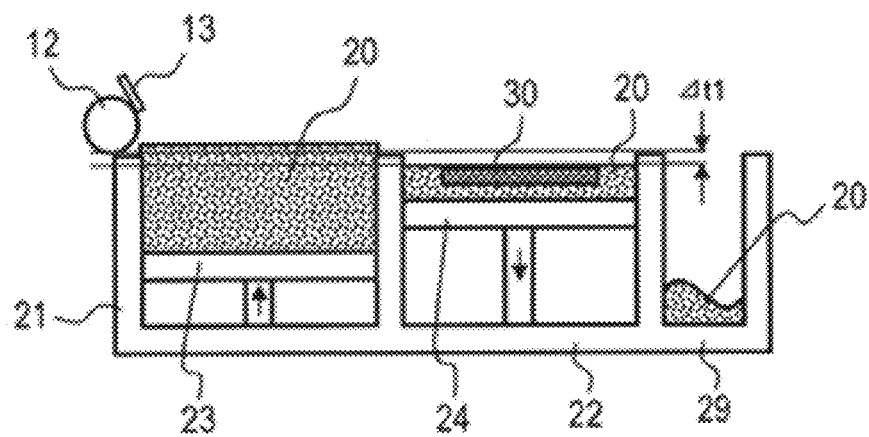
FIG. 6A is a schematic view illustrating an example of an operation of a three-dimensional object producing apparatus.

First, the description will be started from a state in which a first powder layer 30 has been formed on an object forming stage of an object forming tank. When forming the next powder layer on the first powder layer 30, a supplying stage 23 of a supplying tank is moved upward, and the object forming stage 24 of the object forming tank is moved downward as illustrated in FIG. 6A. Here, the distance by which the object forming stage 24 is moved downward is set in a manner that the interval (layer lamination pitch) between the upper surface of the powder layer in the object forming tank 22 and the lower portion (lower tangential portion) of a flattening roller 12 is $\Delta t1$. The interval $\Delta t1$ is not particularly limited, and is preferably about from several tens of micrometers through 100 micrometers.

In the present disclosure, the flattening roller 12 is disposed in a manner to have a gap from the upper-end surfaces of the supplying tank 21 and the object forming tank 22. Therefore, when the flattening roller 12 is conveying and supplying a powder 20 into the object forming tank 22 and flattening the powder, the upper surface of the powder layer is at a position higher than the upper-end surfaces of the supplying tank 21 and the object forming tank 22. This makes it possible to securely prevent the flattening roller 12 from contacting the upper-end surfaces of the supplying tank 21 and the object forming tank 22 and to reduce damages of the flattening roller 12. When the surface of the flattening roller 12 is damaged, the flattening roller 12 tends to generate streaks in the surface of a layer 31 (see FIG. 6D) of the powder supplied into the object forming tank 22 and reduce flatness of the layer.

Figure 6B:
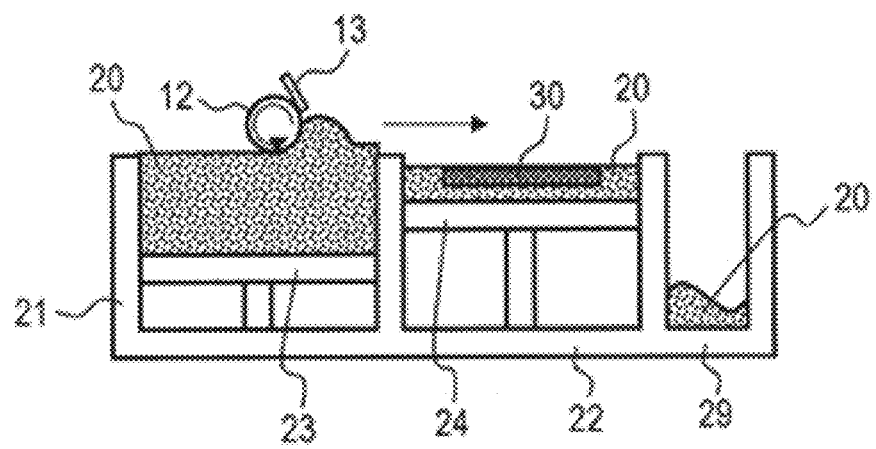
FIG. 6B is a schematic view illustrating another example of an operation of a three-dimensional object producing apparatus.
Figure 6C:
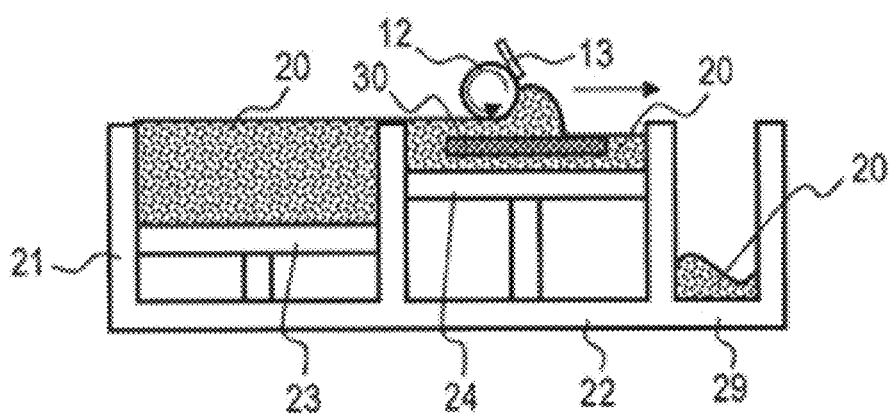
FIG. 6C is a schematic view illustrating another example of an operation of a three-dimensional object producing apparatus.
Figure 6D:
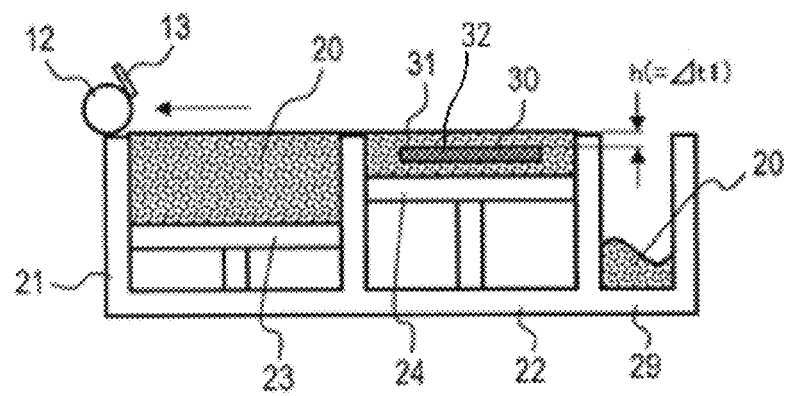
FIG. 6D is a schematic view illustrating another example of an operation of a three-dimensional object producing apparatus.

Next, as illustrated in FIG. 6B, the flattening roller 12 rotates in the direction of the arrow and moves the powder 20, which is placed at a position higher than the upper-end surface of the supplying tank 21, to the object forming tank 22 side, to convey and supply the powder 20 into the object forming tank 22 (powder supplying). Then, as illustrated in FIG. 6C, the flattening roller 12 moves in parallel with the stage surface of the object forming stage 24 of the object forming tank 22, and forms a powder layer 31 having a predetermined thickness $\Delta t1$ on the object forming stage 24 of the object forming tank 22 (flattening). Here, any excessive powder 20 left unused for forming the powder layer 31 falls into an excessive powder receiving tank 29. After the powder layer 31 is formed, the flattening roller 12 moves to the supplying tank 21 side and returns to the initial position (home position) as illustrated in FIG. 6D.

Here, the flattening roller 12 can move while maintaining a constant distance from the upper-end surfaces of the object forming tank 22 and the supplying tank 21. Because the flattening roller 12 can move while maintaining a constant distance, the flattening roller 12 can form a powder layer 31 having a uniform thickness h (corresponding to the layer lamination pitch $\Delta t1$) on the object forming tank 22 or an object forming region and a sintering inhibited region 32 already formed, along with conveying the powder 20 to the object forming tank 22. In the following description, the thickness h of the powder layer 31 and the layer lamination pitch $\Delta t1$ may be described without distinction, but mean the same thickness and the same meaning unless otherwise particularly specified. The thickness h of the powder layer 31 may be obtained by actual measurement. In this case, an average obtained from a plurality of positions is preferable.

Figure 6E:
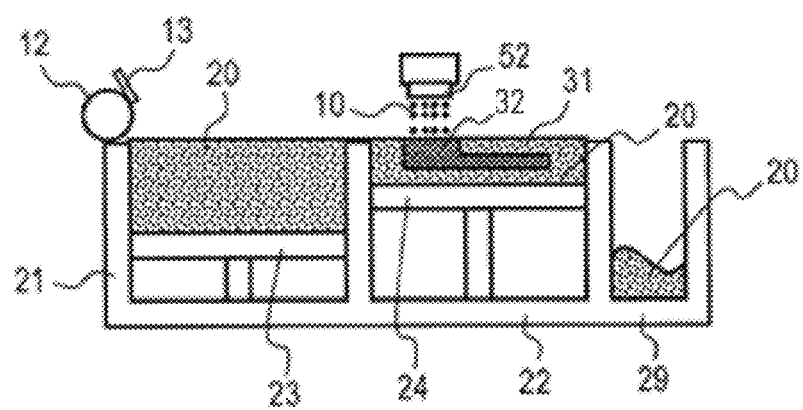
FIG. 6E is a schematic view illustrating another example of an operation of a three-dimensional object producing apparatus.

Subsequently, as illustrated in FIG. 6E, a head 52 of a liquid discharging unit discharges liquid droplets 10 of the object forming liquid and the sintering inhibiting liquid to laminate and form an object forming region and sintering inhibited region 32 having desired shapes in the next powder layer 31. Next, the powder layer forming step, the object forming liquid applying step, and the sintering inhibiting liquid applying step described above are repeated, to form and laminate a new object forming region and sintering inhibited region 32. Here, the new object forming region and sintering inhibited region 32 and the underlying object forming region and sintering inhibited region 32 integrate with each other. Afterwards, the powder layer forming step, the object forming liquid applying step, and the sintering inhibiting liquid applying step are further repeated, to complete a laminate.

EXAMPLES

The present disclosure will be described below by way of Examples. The present disclosure should not be construed as being limited to these Examples.
<Preparation of Sintering Inhibiting Liquid and Sintering Inhibiting Liquid Set>

Preparation Example 1

Polyvinyl pyrrolidone (product name: PVP-K15, with a weight average molecular weight (Mw) of 10,000, obtained from Tokyo Chemical Industry Co., Ltd.) and γ-butyrolactone were mixed with each other, and stirred using a magnetic stirrer for 6 hours, to be dissolved. After stirring, the resultant was passed through a 1-micrometer filter, to obtain a sintering inhibiting liquid of Preparation example 1. The content of polyvinyl pyrrolidone, which was the first resin, in the sintering inhibiting liquid of Preparation example 1 was 20.0% (w/v).

Preparation Example 2

Polyvinyl pyrrolidone (product name: PVP K-25, with a weight average molecular weight (Mw) of 25,000, obtained from FUJIFILM Wako Pure Chemical Corporation) and γ-butyrolactone were mixed with each other, and stirred using a magnetic stirrer for 6 hours, to be dissolved. After stirring, the resultant was passed through a 1-micrometer filter, to obtain a sintering inhibiting liquid of Preparation example 2. The content of polyvinyl pyrrolidone, which was the first resin, in the sintering inhibiting liquid of Preparation example 2 was 16.7% (w/v).

Preparation Example 3

A vinyl chloride-vinyl acetate copolymer (product name: SOLVAIN TAO, with a weight average molecular weight (Mw) of 26,000, obtained from Nissin Chemical Co., Ltd.) and octyl acetate were mixed with each other, and stirred using a magnetic stirrer for 6 hours, to be dissolved. After stirring, the resultant was passed through a 1-micrometer filter, to obtain a sintering inhibiting liquid of Preparation example 3. The content of the vinyl chloride-vinyl acetate copolymer, which was the first resin, in the sintering inhibiting liquid of Preparation example 3 was 9.0% (w/v).

Preparation Example 4

Cellulose acetate (obtained from Daicel Corporation) and triethyl phosphate was mixed with each other, and stirred using a magnetic stirrer for 6 hours, to be dissolved. After stirring, the resultant was passed through a 1-micrometer filter, to obtain a sintering inhibiting liquid of Preparation example 4. The content of cellulose acetate, which was the first resin, in the sintering inhibiting liquid of Preparation example 4 was 6.0% (w/v).

Preparation Example 5

Melamine particles (product name: EPOSTAR SS, with a volume average particle diameter of 100 nm, obtained from Nippon Shokubai Co., Ltd.) and triethylene glycol dimethyl ether were mixed with each other, and subjected to dispersion treatment using a homogenizer, to obtain a sintering inhibiting liquid of Preparation example 5. The content of the melamine particles, which were the first resin, in the sintering inhibiting liquid of Preparation example 5 was 8.0% (w/v).

Preparation Example 6

Benzoguanamine particles (product name: EPOSTAR MS, with a volume average particle diameter of 2 micrometers, obtained from Nippon Shokubai Co., Ltd.) and triethylene glycol dimethyl ether were mixed with each other, and subjected to dispersion treatment using a homogenizer, to obtain a sintering inhibiting liquid of Preparation example 6. The content of the benzoguanamine particles, which were the first resin, in the sintering inhibiting liquid of Preparation example 6 was 8.0% (w/v).

Preparation Example 7

A resin producing liquid X and a resin producing liquid Y described below were combined, to obtain a sintering inhibiting liquid set of Preparation example 7.
—Preparation of Resin Producing Liquid X-
Bisphenol A-diglycidyl ether and neopentyl glycol diglycidyl ether were mixed with each other, and stirred using a magnetic stirrer for 6 hours. After stirring, the resultant was passed through a 1-micrometer filter, to obtain a resin producing liquid X. The content of bisphenol A-diglycidyl ether and neopentyl glycol diglycidyl ether, which were the resin precursor X, in the resin producing liquid X was 100.0% (w/v).
—Preparation of Resin Producing Liquid Y—
Polyamine (product name: FUJICURE FXH-8095, obtained from T&K TOKA Company) and 1,3-bisaminomethyl cyclohexane were mixed with each other, ad stirred using a magnetic stirrer for 6 hours. After stirring, the resultant was passed through a 1-micrometer filter, to obtain a resin producing liquid Y. The content of polyamine and 1,3-bisaminomethyl cyclohexane, which were the resin precursor Y, in the resin producing liquid Y were 100.0% (w/v).

Preparation Example 8

A resin producing liquid X and a resin producing liquid Y described below were combined, to obtain a sintering inhibiting liquid set of Preparation example 8.
—Preparation of Resin Producing Liquid X—
Cyanatomethyl cyclohexane-trimethylolpropane adduct (product name: TAKENATE D120N, obtained from Mitsui Chemicals, Inc.) and propylene glycol monomethyl ether acetate were mixed with each other, and stirred using a magnetic stirrer for 6 hours. After stirring, the resultant was passed through a 1-micrometer filter, to obtain a resin producing liquid X. The content of the cyanatomethyl cyclohexane-trimethylolpropane adduct, which was the resin precursor X, in the resin producing liquid X was 30.0% (w/v).
—Preparation of Resin Producing Liquid Y—
1,3-Bisaminomethyl cyclohexane was passed through a 1-micrometer filter, to obtain a resin producing liquid Y. The content of 1,3-bisaminomethyl cyclohexane, which was the resin precursor Y, in the resin producing liquid Y was 100.0% (w/v).

Comparative Preparation Example 1

Ceramic particles (zirconia powder, product name: TZ-3Y-E, obtained from Tosoh Corporation) and triethylene glycol dimethyl ether were mixed with each other, and subjected to dispersion treatment using a homogenizer, to obtain a sintering inhibiting liquid of Comparative preparation example 1. The content of the ceramic particles in the sintering inhibiting liquid of Comparative preparation example 1 was 8.0% (w/v). For expediency of description in Table 1, the ceramic particles is described in the item "First resin", and the content of the ceramic particles is described in the item "Content of first resin [% (w/v)]".

Comparative Preparation Example 2

Polyvinyl pyrrolidone (product name: PVP-K15, with a weight average molecular weight (Mw) of 10,000, obtained from Tokyo Chemical Industry Co., Ltd.) and γ-butyrolactone were mixed with each other, and stirred using a magnetic stirrer for 6 hours, to be dissolved. After stirring, the resultant was passed through a 1-micrometer filter, to a sintering inhibiting liquid of Comparative preparation example 2. The content of polyvinyl pyrrolidone in the sintering inhibiting liquid of Comparative preparation example 2 was 9.0% (w/v).

Comparative Preparation Example 3

A resin producing liquid X and a resin producing liquid Y described below were combined, to obtain a sintering inhibiting liquid set of Preparation example 3.

—Preparation of Resin Producing Liquid X—
Cyanatomethyl cyclohexane-trimethylolpropane adduct (product name: TAKENATE D120N, obtained from Mitsui Chemicals, Inc.) and propylene glycol monomethyl ether acetate were mixed with each other, and stirred using a magnetic stirrer for 6 hours. After stirring, the resultant was passed through a 1-micrometer filter, to obtain a resin producing liquid X. The content of the cyanatomethyl cyclohexane-trimethylolpropane adduct in the resin producing liquid X was 30.0% (w/v).
—Preparation of Resin Producing Liquid Y—
1,3-Propanediol and propylene glycol monomethyl ether acetate were mixed with each other, and stirred using a magnetic stirrer for 6 hours. After stirring, the resultant was passed through a 1-micrometer filter, to obtain a resin producing liquid Y. The content of 1,3-propanediol in the resin producing liquid Y was 30.0% (w/v).

The components of the sintering inhibiting liquids described above are described in Table 1 below, and the components of the sintering inhibiting liquid sets described above are described in Table 2 below.

TABLE 1

| | | Sintering inhibiting liquid | | |
|---|---|---|---|---|
| | | First resin | Organic solvent | Content of first resin [% (w/v)] |
| Preparation Ex. | 1 | Polyvinyl pyrrolidone | γ-Butyrolactone | 20.0 |
| | 2 | Polyvinyl pyrrolidone | γ-Butyrolactone | 16.7 |
| | 3 | Vinyl chloride-vinyl acetate copolymer | Octyl acetate | 9.0 |
| | 4 | Cellulose acetate | Triethyl phosphate | 6.0 |
| | 5 | Melamine particles | Triethylene glycol dimethyl ether | 8.0 |
| | 6 | Benzoguanamine particles | Triethylene glycol dimethyl ether | 8.0 |
| Comp. Preparation Ex. | 1 | Ceramic particles | Triethylene glycol dimethyl ether | 8.0 |
| | 2 | Polyvinyl pyrrolidone | γ-Butyrolactone | 9.0 |

TABLE 2

| | | Sintering inibiting liquid set | | | | | |
|---|---|---|---|---|---|---|---|
| | | Resin producing liquid X | | | Resin producing liquid Y | | |
| | | Resin precursor X | Organic solvent | Content of resin precursor X [% (w/v)] | Resin precursor Y | Organic solvent | Content of resin precursor Y [% (w/v)] |
| Preparation Ex. | 7 | Bisphenol A-diglycidyl ether, Neopentyl glycol diglycidyl ether | — | 100.0 | Polyamine, 1,3-Bisaminomethyl cyclohexane | — | 100.0 |
| | 8 | Cyanatomethyl cyclohexane-trimethylolpropane adduct | Propylene glycol monomethyl ether acetate | 30.0 | 1,3 Bisaminomethyl cyclohexane | — | 100.0 |

TABLE 2-continued

| | | Sintering inibiting liquid set | | | | |
| | | Resin producing liquid X | | | Resin producing liquid Y | |
| | | Resin precursor X | Organic solvent | Content of resin precursor X [% (w/v)] | Resin precursor Y | Organic solvent | Content of resin precursor Y [% (w/v)] |
|---|---|---|---|---|---|---|---|
| Comp. Preparation Ex. | 3 | Cyanato-methyl cyclohexane-trimethylol-proprane adduct | Propylene glycol mono-methyl ether acetate | 30.0 | 1,3-Propanediol | Propylene glycol monomethyl ether acetate | 30.0 |

[Dispersibility (Discharging Stability)]

The sintering inhibiting liquids prepared and the resin producing liquids constituting the sintering inhibiting liquid sets prepared were each filled in an inkjet head GH5420 (obtained from Ricoh Company, Ltd.) and left to stand still for a certain time. Subsequently, stability of the discharging state was observed with a strobe camera. As the discharging apparatus, an extensive coating machine EV2500 (obtained from Ricoh Company, Ltd.) was used. The result of observation was evaluated according to the evaluation criteria described below. The results of evaluation are presented in Tables 3 and 4 below.

(Evaluation Criteria)
- A: When the time for which the liquid was left to stand still was 10 minutes, the liquid was successfully discharged without bent discharging or discharging failure through nozzles.
- B: When the time for which the liquid was left to stand still was 3 minutes, the liquid was successfully discharged without bent discharging or discharging failure through nozzles. When the time for which the liquid was left to stand still was 10 minutes, bent discharging or discharging failure through nozzles occurred, but the normal discharging state was recovered by a maintenance operation such as pressurized drainage.
- C: When the time for which the liquid was left to stand still was 3 minutes, bent discharging or discharging failure through nozzles occurred, and the normal discharging state was not recovered by a maintenance operation such as pressurized drainage.

[Storage Stability]

The sintering inhibiting liquids prepared and the resin producing liquids constituting the sintering inhibiting liquid sets prepared were each airtightly sealed and stored within a 100-mL vial, and left to stand still for a certain time. Subsequently, the state of each liquid was evaluated according to the evaluation criteria described below. The results of evaluation are presented in Tables 3 to 4.

(Evaluation Criteria)
- A: When the liquid was left to stand still for a day, no precipitate occurred, and no concentration unevenness occurred between the top and the bottom of the liquid.
- B: When the liquid was left to stand still for a day, concentration unevenness occurred between the top and the bottom of the liquid, but a uniform state was recovered when the liquid was shaken twice or three times.
- C: When the liquid was left to stand still for a day, a precipitate occurred, and a uniform state would not be recovered unless the liquid was shaken sufficiently. Even when the liquid was shaken, concentration unevenness occurred between the top and the bottom of the liquid.

[Viscosity]

The viscosity of each of the sintering inhibiting liquids prepared and the resin producing liquids constituting the sintering inhibiting liquid sets prepared was measured at 25 degrees C. All of the liquids had a viscosity of 30 mPa·s or lower.

<Production of Sample Product>

Examples 1 to 8 and Comparative Examples 1 to 3

Using the sintering inhibiting liquids or sintering inhibiting liquid sets prepared and a powder ($AlSi_{10}Mg$ powder (obtained from Toyo Aluminium K.K., SI10MG-30BB, with a volume average particle diameter of 35 micrometers)), sample products that could be regarded as sintering inhibited parts were produced in the manner described below.

1) First, using a known object producing apparatus as illustrated in FIG. 6A to FIG. 6E, a powder was conveyed from a supplying-side powder storing tank to a forming-side powder storing tank, to form a thin layer (one layer) of the powder having an average thickness of 84 micrometers on a support.
2) Next, the sintering inhibiting liquid or each resin producing liquid constituting the sintering inhibiting liquid set was discharged through nozzles of a known inkjet discharging head and applied to the surface of the formed thin layer of the powder. For application of the sintering inhibiting liquid, the sintering inhibiting liquid was discharged in a manner that the amount of application per 300 dpi×300 dpi region would be 45 pL. For application of each resin producing liquid constituting the sintering inhibiting liquid set, the resin producing liquid X was discharged in a manner that the amount of application per 300 dpi×300 dpi region would be 22.5 pL, and the resin producing liquid Y was discharged in a manner that the amount of application on the same region would be 22.5 pL.
3) Next, using a vacuum dryer, the resultant was left to stand in an environment in a vacuum at 200 degrees C. for 4 hours, to produce a sample product containing "the first resin or the second resin" or "the third resin".
4) Next, the sample product was degreased by heating, to obtain a degreased product. The degreased product was sintered by additional heating, to produce a sintered product.

Next, the ratio of a residue of "the first resin or the second resin" or "the third resin" contained in the sample product produced in 3) above through thermal decomposition at 550 degrees C. was calculated. The result of evaluation is presented in Tables 3 and 4 below.

The ratio of a residue through thermal decomposition was calculated according to the following formula: "mass of a residue of the first resin or the second resin when the first resin or the second resin was thermally decomposed at 550 degrees C./mass of the first resin or the second resin before thermal decomposition". The mass of the residue of the first resin or the second resin when the first resin or the second resin was thermally decomposed at 550 degrees C. was measured using a thermogravimetry-differential thermal analysis system (TG-DTA). Specifically, when the sample product was subjected to temperature elevation from 30 degrees C. to 550 degrees C. at a rate of 10 degrees C./minute in the atmosphere or a nitrogen atmosphere and then subjected to temperature retention for 2 hours after the temperature reached 550 degrees C., the weight after the temperature elevation (mass of a residue) was measured.

Each polyvinyl pyrrolidone, which was the first resin contained in the sintering inhibiting liquids of Examples 1 and 2 and Comparative Example 2, underwent a cross-linking reaction in the heating step of 3) described above, to produce polyvinyl polypyrrolidone, which was the second resin.

Next, the predicted amount of a residue was calculated by multiplying the mass ratio of the first resin or the second resin to the powder in a sintering inhibited region (sintering inhibited part) by the ratio of the residue of the first resin or the second resin through thermal decomposition at 550 degrees C. The result of evaluation is presented in Tables 3 and 4 below.

[Relative Sintering Density]

First, the density of the sintered product produced in 4) described above was measured. Next, the ratio of the density of the sintered product to the true density of the material constituting the sintered product was calculated. The result of calculation is presented in Tables 3 and 4 below.

TABLE 3

| | | Sintering inhibiting liquid | | Ratio of residue of first or second resin thru thermal decomposition at 550 degrees C. | | Predicted amount of residue [ppm] | Relative sintering density [%] | Dispersibility | Storage stability |
|---|---|---|---|---|---|---|---|---|---|
| Ex. | 1 | Preparation Ex. | 1 | Second resin | 0.134 | 1,343 | 55 | A | A |
| | 2 | | 2 | Second resin | 0.156 | 1,306 | 55 | A | A |
| | 3 | | 3 | First resin | 0.234 | 1,055 | 80 | A | A |
| | 4 | | 4 | First resin | 0.270 | 812 | 85 | A | A |
| | 5 | | 5 | First resin | 0.400 | 1,604 | 55 | B | B |
| | 6 | | 6 | First resin | 0.400 | 1,604 | 55 | B | B |
| Comp. Ex. | 1 | Comp. preparation Ex. | 1 | Second resin | 1.000 | 4,009 | 55 | C | C |
| | 2 | | 2 | Second resin | 0.134 | 605 | 95 | A | A |

TABLE 4

| | | Sintering inhibiting liquid set | | Ratio of residue of third resin thru thermal decomposition at 550 degrees C. | Predicted amount of residue [ppm] | Relative sintering density [%] | Dispersibility | Storage stability |
|---|---|---|---|---|---|---|---|---|
| Ex. | 7 | Preparation Ex. | 7 | 0.021 | 1,053 | 80 | A | A |
| | 8 | | 8 | 0.130 | 978 | 55 | A | A |
| Comp. Ex. | 3 | Comp. preparation Ex. | 3 | 0.010 | 150 | 98 | A | A |

According to Examples 1 and 2, it was possible to obtain sintering inhibiting liquids excellent in dispersibility and storage stability. It was also possible to obtain sintering inhibiting liquids that were able to provide sintered products having a low relative sintering density. Moreover, it was possible to obtain sintering inhibiting liquids that were able to improve handleability of sintering inhibited parts by means of a binder function for binding particles with each other in a powder layer.

According to Examples 3 and 4, it was possible to obtain sintering inhibiting liquids excellent in dispersibility and storage stability. It was also possible to obtain sintering inhibiting liquids that were able to provide sintered products having a low relative sintering density, although slightly inferior to Examples 1 and 2 due to the difference in the kind of the resin. Moreover, it was possible to obtain sintering inhibiting liquids that were able to improve handleability of sintering inhibited parts by means of a binder function for binding particles with each other in a powder layer, although the improvement was slightly inferior to Examples 1 and 2 due to the difference in the kind of the resin. However, Examples 3 and 4 were superior to Examples 1 and 2 because there was no need for chemically changing the first resin by the heating step.

According to Example 5, it was possible to obtain a sintering inhibiting liquid excellent in dispersibility and storage stability, although slightly inferior to Examples 1 and 2 because the resin was in a dispersed form. It was also possible to obtain a sintering inhibiting liquid that was able to provide a sintered product having a low relative sintering density. Moreover, because the sintering inhibiting liquid was able to exhibit a sintering inhibiting effect by a small amount of addition, there was an advantage because, for example, a resin having a binder function could be used in combination with the sintering inhibiting liquid.

According to Example 6, it was possible to obtain a sintering inhibiting liquid excellent in dispersibility, although slightly inferior to Examples 1 and 2 because the resin was in a dispersed form. It was also possible to obtain a sintering inhibiting liquid that was able to provide a sintered product having a low relative sintering density. Moreover, because the sintering inhibiting liquid was able to exhibit a sintering inhibiting effect by a small amount of addition, there was an advantage because, for example, a resin having a binder function could be used in combination with the sintering inhibiting liquid. However, the sintering inhibiting liquid had a poor dispersibility because the volume average particle diameter of the resin was large.

According to Comparative Example 1, the sintering inhibiting liquid was able to provide a sintered product having a low relative sintering density. On the other hand, the sintering inhibiting liquid had a poor dispersibility and a poor storage stability because the specific gravity of the ceramic particles was high.

According to Comparative Example 2, although the same materials as in Example 1 were used, it was impossible to provide a sintered product having a low relative sintering density because the content of the resin was low.

According to Example 7, it was possible to obtain sintering inhibiting liquids excellent in dispersibility and storage stability. It was also possible to obtain sintering inhibiting liquids that were able to provide a sintered product having a low relative sintering density, although slightly inferior to Examples 1 and 2.

According to Example 8, it was possible to obtain sintering inhibiting liquids that were excellent in dispersibility and storage stability. It was also possible to obtain sintering inhibiting liquids that were able to provide a sintered product having a low relative sintering density.

According to Comparative Example 3, it was impossible to provide a sintered product having a low relative sintering density, because the materials were changed from the materials used in Example 8.

<Preparation of Object Forming Liquid>

Polyvinyl butyral (ESLEC BL-10 obtained from Sekisui Chemical Co., Ltd.) and triethylene glycol dimethyl ether (TRIGLYME obtained from Sankyo Chemical Co., Ltd.) were mixed with each other, and stirred using a homomixer for 30 minutes, to be dissolved. After stirring, the resultant was passed through a 1-micrometer filter, to obtain an object forming liquid. The content of polyvinyl butyral in the object forming liquid was 7.0% by mass relative to the mass of the object forming liquid.

<Production of Object>

Example 9

Using the sintering inhibiting liquid of Preparation example 1, the object forming liquid, and a powder (AlSi$_{10}$Mg powder (obtained from Toyo Aluminium K.K., SI10MG-30BB, with a volume average particle diameter of 35 micrometers)), an object was produced in the manner described below.

1) First, using a known object producing apparatus as illustrated in FIG. 6A to FIG. 6E, a powder was conveyed from a supplying-side powder storing tank to a forming-side powder storing tank, to form a thin layer of the powder having an average thickness of 84 micrometers on a support.
2) Next, the object forming liquid was discharged through nozzles of a known inkjet discharging head and applied to the surface of the formed thin layer of the powder, to form an object forming region and a support region. For application of the object forming liquid, the object forming liquid was discharged in a manner that the amount of application per 300 dpi×300 dpi region would be 45 pL. The sintering inhibiting liquid was discharged through nozzles of a known inkjet discharging head and applied to the surface of the formed thin layer of the powder, to form a sintering inhibited region. For application of the sintering inhibiting liquid, the sintering inhibiting liquid was discharged in a manner that the amount of application per 300 dpi×300 dpi region would be 45 pL. The object forming liquid and the sintering inhibiting liquid were discharged in a manner that the object forming region and the support region would adjoin each other via the sintering inhibited region.
3) Next, the operations of 1) and 2) described above were repeated until a predetermined total average thickness (total of thicknesses of objects) of 15 mm micrometers, to form a laminate that included an object forming part formed by laminating object forming regions, a sintering inhibited part formed by laminating sintering inhibited regions, and a support part formed by laminating support regions, and in which the support part was disposed in a manner to support the object forming part via the sintering inhibited part.
4) Next, using a vacuum dryer, the resultant was left to stand in an environment in a vacuum at 200 degrees C. for 4 hours.
5) Next, the resultant was blown with air, to remove any excessive powder.
6) Next, the structure formed of the object forming part, the sintering inhibited part, and the support part was degreased by heating, to obtain a degreased product. The degreased product was sintered by additional heating, to obtain a sintered product.
7) Next, the sintered products of the sintering inhibited part and the support part were released, to obtain an object.

Figure 7:
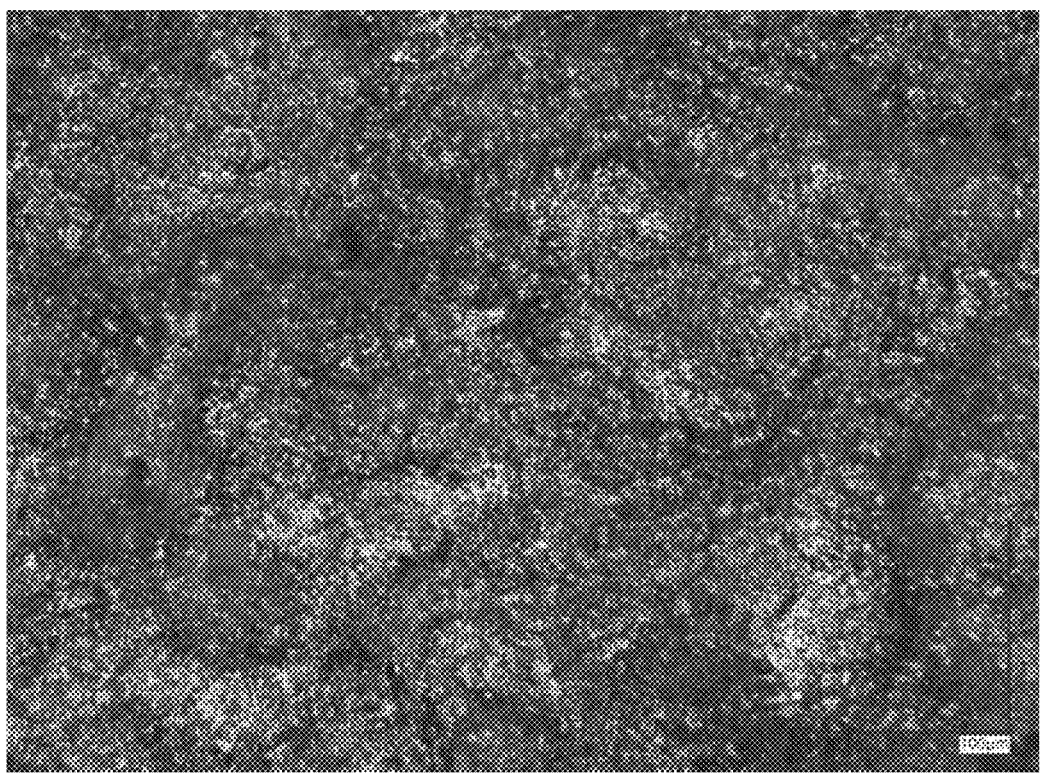
FIG. 7 is a microscope image of a sintered product of an object forming part.
Figure 8:
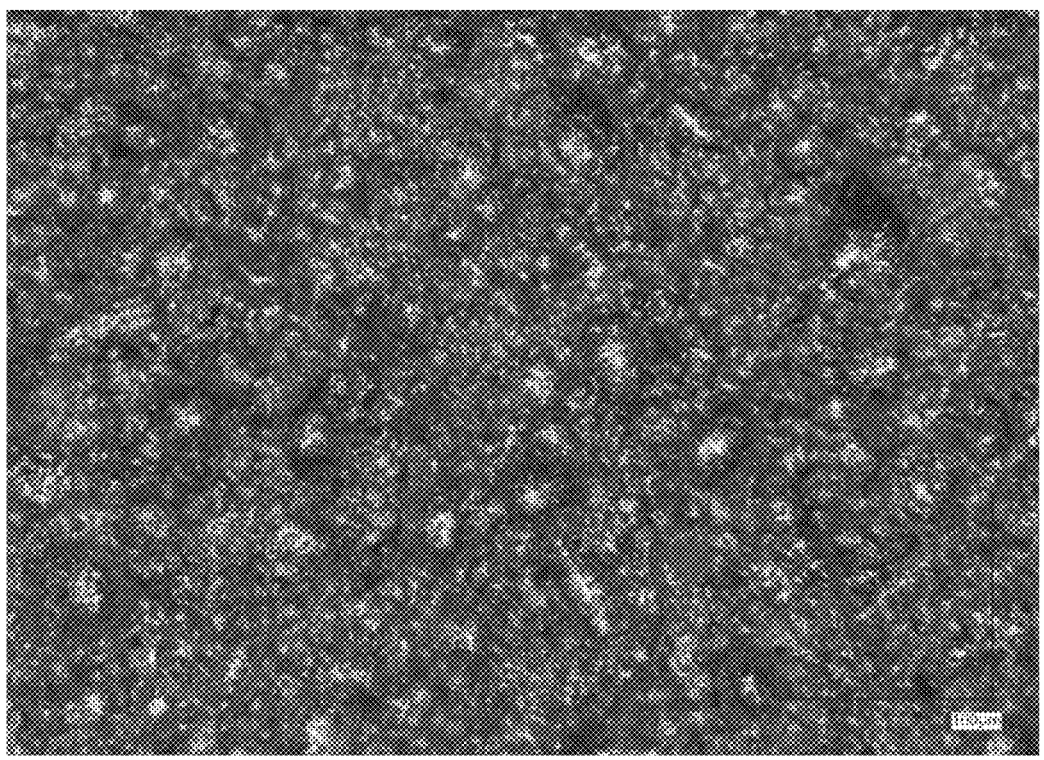
FIG. 8 is a microscope image of a sintered product of a sintering inhibited part.

In the sintered product obtained in 6) described above, the relative sintering density of the object forming part and the support part was 93%, meaning that sintering had proceeded and densification of the particle shapes of the sinterable material had been completed in the object forming part and the support part. On the other hand, the relative sintering density of the sintering inhibited part was 56%, meaning that sintering had not almost proceeded and the particle shapes of the sinterable material had been maintained in the sintering inhibited part. FIG. 7 illustrates a microscope image of the sintered product of the object forming part, and FIG. 8 illustrates a microscope image of the sintered product of the sintering inhibited part. The microscope images were captured with VHX-7000 obtained from Keyence Corporation.

During degreasing and sintering in 6) described above, by being supported by the support part, the object forming part was suppressed from being deformed, and an object having a high dimensional accuracy was obtained.

In 7) described above, the sintered body of the sintering inhibited part had minute cracks. This made it easier to release the sintered products of the sintering inhibited part and the support part and obtain the sintered body of the object forming part.

Comparative Example 4

An object was produced in the same manner as in Example 9, except that the object forming liquid was used instead of the sintering inhibiting liquid of Preparation example 1.

As a result, sintering proceeded, and densification of the particle shapes of the sinterable material was completed in all of the object forming part, the sintering inhibited part, and the support part. Hence, it was difficult to release the sintered products of the sintering inhibited part and the support part and obtain the sintered body of the object forming part in 7) described above.

Example 10

An object was produced in the same manner as in Example 9, except that the amount of application of the sintering inhibiting liquid was changed from 45 pL to 200 pL in 2) described above.

As a result, the strength of the sintering inhibited part before degreasing in 6) described above was improved, and handleability of the sintering inhibited part was improved consequently. The relative sintering density of the sintering inhibited part was better suppressed in the sintered product obtained in 6) described above. This made it further easier to release the sintered products of the sintering inhibited part and the support part and obtain the sintered body of the object forming part in 7) described above.

Example 11

An object was produced in the same manner as in Example 9, except that after 2) described above was completed, the object forming liquid was further discharged through the nozzles of the known inkjet discharging head and applied to the sintering inhibited region formed. For application of the object forming liquid to the sintering inhibited region after the sintering inhibited region was formed, the object forming liquid was discharged in a manner that the amount of application per 300 dpi×300 dpi region would be 45 pL.

As a result, the strength of the sintering inhibited part before degreasing in 6) described above was improved, and handleability of the sintering inhibited part was improved consequently. Moreover, the resins were degraded through two stages. This suppressed excessive cracking of the sintering inhibited part during degreasing in 6) described above.

Example 12

An object was produced in the same manner as in Example 9, except that in 2) described above, the object forming liquid and the sintering inhibiting liquid were discharged in a manner that a sintering inhibited region would be placed in a powder layer in a manner to surround the circumference of an object forming region as illustrated in FIG. 3.

As a result, the sintering inhibited part was suppressed from collapsing during sintering in 6) described above, and the dimensional accuracy of the object was improved.

Example 13

An object was produced in the same manner as in Example 9, except that regarding the timings in 2) described above to apply liquid droplets of the object forming liquid, which were to be discharged to positions at which a boundary between the object forming region and the sintering inhibited region would be formed, and to apply liquid droplets of the sintering inhibiting liquid, which were to be discharged in a manner to adjoin these positions, the liquid droplets of the sintering inhibiting liquid were adjusted in a manner to be applied within 100 msec from when the liquid droplets of the object forming liquid were applied.

As a result, the object forming liquid applied to the powder was suppressed from exuding to the positions intended to become the sintering inhibited region, and the dimensional accuracy of the object was improved.

Example 14

An object was produced in the same manner as in Example 9, except that in 3) described above, a laminate including an integrated product in which a plurality of object forming parts and coupling parts formed of sintering inhibited parts and coupling the object forming parts to each other were included and integrated as illustrated in FIG. 4 was formed.

As a result, it was possible to reduce the number of steps of placing the plurality of object forming parts in a sintering furnace by rearranging the plurality of object forming parts before sintering in 6) described above, and the working efficiency during production of the object was improved.

Example 15

An object was produced in the same manner as in Example 9, except that a laminate including an object forming part and a sintering inhibited part including a structure covering the whole circumference of the object forming part and a plate-like structure continuous to the external surface of the laminate and dividing the external surface of the laminate into two regions as illustrated in FIG. 5 was formed in 3) described above, and the step of removing an excessive powder by air blowing in 5) described above was omitted.

As a result, because no excessive powder could adhere to the object forming part, it was possible to omit the excessive powder removing step, and productivity during production of the object was improved.

Aspects of the present disclosure are, for example, as follows.
<1> An object producing method, including:
forming a layer of a powder containing particles that are sinterable;
applying an object forming liquid to the layer of the powder to form an object forming region; and
applying a sintering inhibiting liquid to the layer of the powder to form a sintering inhibited region in which sintering of the particles is inhibited,
wherein the object producing method further includes sequentially repeating the forming, the applying the object forming liquid, and the applying the sintering inhibiting liquid, to form a laminate, the object forming region and the sintering inhibited region adjoin each other, the sintering inhibiting liquid contains a first resin, the sintering inhibited region contains the first resin or a second resin derived from the first resin, and a predicted amount of a residue calculated by multiplying a mass ratio (mass of the first resin or the second resin/mass of the powder) between a mass of the first resin or the second resin and a mass of the powder in a sintering inhibited part formed by laminating the sintering inhibited region by a ratio of a residue of the first resin or the second resin through thermal decomposition at 550 degrees C. is 800 ppm or greater.

<2> The object producing method according to <1>,
wherein the predicted amount of the residue is 1,000 ppm or greater.

<3> The object producing method according to <1> or <2>
wherein the first resin is dissolved in the sintering inhibiting liquid.

<4> The object producing method according to <1> or <2>
wherein the first resin is dispersed in the sintering inhibiting liquid.

<5> The object producing method according to <4>,
wherein a volume average particle diameter of the first resin is 1 micrometer or less.

<6> The object producing method according to any one of <1> to <5>,
wherein the ratio of the residue of the first resin or the second resin in the sintering inhibited part through thermal decomposition at 550 degrees C. is 0.100 or higher.

<7> The object producing method according to any one of <1> to <6>,
wherein a viscosity of the sintering inhibiting liquid at 25 degrees C. is 30 mPa·s or lower.

<8> The object producing method according to any one of <1> to <7>,
wherein the sintering inhibited region contains the second resin, and
the ratio of the residue of the second resin in the sintering inhibited part through thermal decomposition at 550 degrees C. is higher than a ratio of a residue of the first resin through thermal decomposition at 550 degrees C.

<9> The object producing method according to any one of <1> to <8>,
wherein the second inhibited region contains the second resin, and
the second resin in the sintering inhibited part is produced through a cross-linking reaction of the first resin.

<10> The object producing method according to any one of <1> to <9>,
wherein the first resin is polyvinyl pyrrolidone.

<11> The object producing method according to any one of <1> to <7>,
wherein the first resin is at least one selected from the group consisting of polyvinyl chloride, polyvinylidene chloride, cellulose acetate, polyacrylonitrile, acrylonitrile-styrene copolymers, acrylonitrile-butadiene-styrene copolymers, vinyl chloride-vinyl acetate copolymers, polyethylene terephthalate, phenol resins, melamine resins, urea resins, unsaturated polyester, epoxy resins, silicon resins, polyvinyl polypyrrolidone, and benzoguanamine resins.

<12> The object producing method according to any one of <1> to <11>,
wherein the particles contain aluminum.

<13> The object producing method according to any one of <1> to <12>,
wherein a relative sintering density of a sintered product formed by sintering the sintering inhibited part formed by laminating the sintering inhibited region is 60% or lower.

<14> The object producing method according to any one of <1> to <13>,
wherein in the applying the object forming liquid, the object forming liquid is applied to the layer of the powder to form the object forming region and a support region, and
the object forming region and the support region adjoin each other via the sintering inhibited region.

<15> The object producing method according to any one of <1> to <14>,
wherein an amount of application of the sintering inhibiting liquid applied per unit area of the sintering inhibited region is higher than an amount of application of the object forming liquid applied per unit area of the object forming region.

<16> The object producing method according to any one of <1> to <14>,
wherein in the applying the object forming liquid, the object forming liquid is further applied to the sintering inhibited region after the sintering inhibited region is formed.

<17> The object producing method according to <1>,
wherein the object forming region is surrounded by the sintering inhibited region.

<18> The object producing method according to any one of <1> to <14>,
wherein at a boundary between the object forming region and the sintering inhibited region, the sintering inhibiting liquid is applied within 100 msec from when the object forming liquid is applied.

<19> The object producing method according to according to any one of <1> to <14>,
wherein the laminate includes a plurality of object forming parts each formed by laminating the object forming region, and a coupling part coupling the object forming parts to each other, and
at least regions of the coupling part contacting the object forming parts are formed of sintering inhibited parts each formed by laminating the sintering inhibited region.

<20> The object producing method according to any one of <1> to <14>,
wherein the laminate includes an object forming part formed by laminating the object forming region, and a sintering inhibited part formed by laminating the sintering inhibited region, and
a whole circumference of the object forming part is covered by the sintering inhibited part.

<21> An object producing method, including:
forming a layer of a powder containing particles that are sinterable;
applying an object forming liquid to the layer of the powder to form an object forming region; and
applying a resin producing liquid X and a resin producing liquid Y independently to the layer of the powder, to form a sintering inhibited region in which sintering of the particles is inhibited by contact between the resin producing liquid X and the resin producing liquid Y in the layer of the powder to which the resin producing liquid X and the resin producing liquid Y have been applied, wherein the object producing method further includes sequentially repeating the forming, the applying the object forming liquid, and the applying the resin producing liquid X and the resin producing liquid Y, to form a laminate, the object forming region and the sintering inhibited region adjoin each other, the sintering inhibited region contains a third resin produced by the contact between the resin producing liquid X and the resin producing liquid Y, and a predicted amount of a residue calculated by multiplying a mass ratio (mass of the third resin/mass of the powder) between a mass of the third resin and a mass of the powder in a sintering inhibited part formed by laminating the sintering inhibited region by a ratio of a residue of the third resin through thermal decomposition at 550 degrees C. is 800 ppm or greater.

The object producing method according to any one of <1> to <21> can solve the various problems in the related art and achieve the object of the present disclosure.

What is claimed is:

1. An object producing method, comprising:
   forming a layer of a powder containing particles that are sinterable;
   applying an object forming liquid to the layer of the powder to form an object forming region; and
   applying a sintering inhibiting liquid to the layer of the powder to form a sintering inhibited region in which sintering of the particles is inhibited,
   wherein the object producing method further comprises sequentially repeating the forming, the applying the object forming liquid, and the applying the sintering inhibiting liquid, to form a laminate,
   the object forming region and the sintering inhibited region adjoin each other,
   the sintering inhibiting liquid contains a first resin,
   all compounds in the sintering inhibiting liquid are dissolved,
   the sintering inhibited region contains the first resin or a second resin derived from the first resin, and
   a predicted amount of a residue calculated by multiplying a mass ratio (mass of the first resin or the second resin/mass of the powder) between a mass of the first resin or the second resin and a mass of the powder in a sintering inhibited part formed by laminating the sintering inhibited region by a ratio of a residue of the first resin or the second resin through thermal decomposition at 550 degrees C. is 800 ppm or greater.

2. The object producing method according to claim 1, wherein the predicted amount of the residue is 1,000 ppm or greater.

3. The object producing method according to claim 1, wherein the ratio of the residue of the first resin or the second resin in the sintering inhibited part through thermal decomposition at 550 degrees C. is 0.100 or higher.

4. The object producing method according to claim 1, wherein a viscosity of the sintering inhibiting liquid at 25 degrees C. is 30 mPa·s or lower.

5. The object producing method according to claim 1, wherein the sintering inhibited region contains the second resin, and
the ratio of the residue of the second resin in the sintering inhibited part through thermal decomposition at 550 degrees C. is higher than a ratio of a residue of the first resin through thermal decomposition at 550 degrees C.

6. The object producing method according to claim 1, wherein the sintering inhibited region contains the second resin, and
the second resin in the sintering inhibited part is produced through a cross-linking reaction of the first resin.

7. The object producing method according to claim 1, wherein the first resin is polyvinyl pyrrolidone.

8. The object producing method according to claim 1, wherein the first resin is at least one selected from the group consisting of polyvinyl chloride, poly vinylidene chloride, cellulose acetate, polyacrylonitrile, acrylonitrile-styrene copolymers, acrylonitrile-butadiene-styrene copolymers, vinyl chloride-vinyl acetate copolymers, polyethylene terephthalate, phenol resins, melamine resins, urea resins, unsaturated polyester, epoxy resins, silicon resins, polyvinyl polypyrrolidone, and benzoguanamine resins.

9. The object producing method according to claim 1, wherein the particles contain aluminum.

10. The object producing method according to claim 1, wherein a relative sintering density of a sintered product formed by sintering the sintering inhibited part formed by laminating the sintering inhibited region is 60% or lower.

11. The object producing method according to claim 1, wherein in the applying the object forming liquid, the object forming liquid is applied to the layer of the powder to form the object forming region and a support region, and
the object forming region and the support region adjoin each other via the sintering inhibited region.

12. The object producing method according to claim 1, wherein an amount of application of the sintering inhibiting liquid applied per unit area of the sintering inhibited region is higher than an amount of application of the object forming liquid applied per unit area of the object forming region.

13. The object producing method according to claim 1, wherein in the applying the object forming liquid, the object forming liquid is further applied to the sintering inhibited region after the sintering inhibited region is formed.

14. The object producing method according to claim 1, wherein the object forming region is surrounded by the sintering inhibited region.

15. The object producing method according to claim 1, wherein at a boundary between the object forming region and the sintering inhibited region, the sintering inhibiting liquid is applied within 100 msec from when the object forming liquid is applied.

16. The object producing method according to claim 1, wherein the laminate includes a plurality of object forming parts each formed by laminating the object forming region, and a coupling part coupling the object forming parts to each other, and
at least regions of the coupling part contacting the object forming parts are formed of sintering inhibited parts each formed by laminating the sintering inhibited region.

17. The object producing method according to claim 1,
wherein the laminate includes an object forming part formed by laminating the object forming region, and a sintering inhibited part formed by laminating the sintering inhibited region, and a whole circumference of the object forming part is covered by the sintering inhibited part.

18. The object producing method according to claim 1, further comprising sintering the object at a sintering temperature of 600 degrees C. or lower, wherein the sintering inhibiting liquid contains 10% by mass or less water relative to the mass of the sintering inhibiting liquid, and wherein the particles comprise aluminum.

19. The object producing method according to claim 1, wherein the sintering inhibited region contains the first resin and the second resin derived from the first resin, and wherein the second resin is chemically different from the first resin.

* * * * *